(12) United States Patent
Lakkapragada et al.

(10) Patent No.: US 7,165,189 B1
(45) Date of Patent: Jan. 16, 2007

(54) DISTRIBUTED TEST FRAMEWORK FOR CLUSTERED SYSTEMS

(75) Inventors: Sekhar G. Lakkapragada, San Jose, CA (US); Ambujavalli Kesavan, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 488 days.

(21) Appl. No.: 10/741,112

(22) Filed: Dec. 19, 2003

(51) Int. Cl.
*G06F 11/00* (2006.01)

(52) U.S. Cl. .......................................... 714/31; 709/220
(58) Field of Classification Search ................. 714/31, 714/43, 48, 32, 33; 709/220, 221
See application file for complete search history.

(56) References Cited

U.S. PATENT DOCUMENTS

| | | | | |
|---|---|---|---|---|
| 5,537,653 A | * | 7/1996 | Bianchini, Jr. ............... | 714/25 |
| 5,909,544 A | * | 6/1999 | Anderson et al. ............ | 709/208 |
| 6,243,759 B1 | * | 6/2001 | Boden et al. ................ | 709/238 |
| 6,286,038 B1 | * | 9/2001 | Reichmeyer et al. ....... | 709/220 |
| 6,449,641 B1 | * | 9/2002 | Moiin et al. ................. | 709/220 |
| 6,662,217 B1 | * | 12/2003 | Godfrey et al. ............. | 709/219 |
| 7,016,946 B1 | * | 3/2006 | Shirriff ....................... | 709/221 |
| 2002/0161867 A1 | * | 10/2002 | Cochran et al. ............ | 709/221 |
| 2003/0023680 A1 | * | 1/2003 | Shirriff ....................... | 709/204 |
| 2003/0101243 A1 | * | 5/2003 | Donahue et al. ............ | 709/220 |
| 2003/0172150 A1 | * | 9/2003 | Kennedy ..................... | 709/224 |
| 2005/0114515 A1 | * | 5/2005 | Droms ........................ | 709/227 |

* cited by examiner

*Primary Examiner*—Nadeem Iqbal
(74) *Attorney, Agent, or Firm*—Dorsey & Whitney LLP

(57) ABSTRACT

Methods and apparatus, including computer program products, implementing and using techniques for testing a computing cluster having several computing nodes. Configuration information regarding a test system is received and used to generate a configuration file that profiles the test system. The configuration file may be passed to each computing machine in the test system whereupon an appropriate test suite is launched on each computing machine in the test system to perform the tests contemplated by the test suite.

26 Claims, 25 Drawing Sheets

FIG. 7

Global Device Load Test with Faults         /214
          REQUEST   start_faults          /220
                    DONT_WAIT = TRUE
                 :
                 :
          END
          REQUEST   gdev_load /216        /222
                    DONT_WAIT = FALSE
                 :
                 :
          END
                                          /218
          REQUEST   stop_faults
                 :
                 :
          END FIG. 8A - Test Request File (Example)

```
# SCATE Automated test request file
# Generated: Tue Oct 14 00:22:51 PDT 2003
# scaterun 1.3 Aug 8 2003

LOGDIR=/opt/SUNWscts/15k

CLUSTER
        NODENAME=phys-autotech-1
        RSH=/usr/bin/rsh
        RCP=/usr/bin/rcp
        CLIENTS="master-27-4 "
END REQUEST collect_system_info
        USER=scate
END

Filesystem stress test request

REQUEST start_stresser
        USER=scate
        STRESSERS="diskomizer"
        NUM_HOURS=1
        NUM_PROCS=25
        FAILOVER_ADDRESS_1="autotech-173-2"
        HASPLUS_1=YES
        FAILOVER_HOSTS_1="phys-autotech-1,phys-autotech-2"
        FAILOVER_ADAPTERS_1="sc_ipmp0@1,sc_ipmp0@2"
        RAWDISKLIST_1="/dev/vx/rdsk/test1/vol01 /dev/vx/rdsk/test/vol01 "
        FSTYPELIST_1="ufs ufs"
END

Oracle load request

REQUEST start_db_stresser
        USER=scate
        SETUP=FALSE
        CLEANUP=FALSE
        NUM_PROCS=25
        NUM_HOURS=1
        DBA_ACCOUNT_USER="oracle"
        ORACLE_HOME="/opt/oracle/9i"
        FAILOVER_ADDRESS_1="autotech-173-1"
        FAILOVER_HOSTS_1="phys-autotech-1,phys-autotech-2"
        FAILOVER_ADAPTERS_1="sc_ipmp2@1,sc_ipmp2@2"
        FILESYSTEM=/global/oracle
END
```

FIG. 8B - Test Request File (Example)

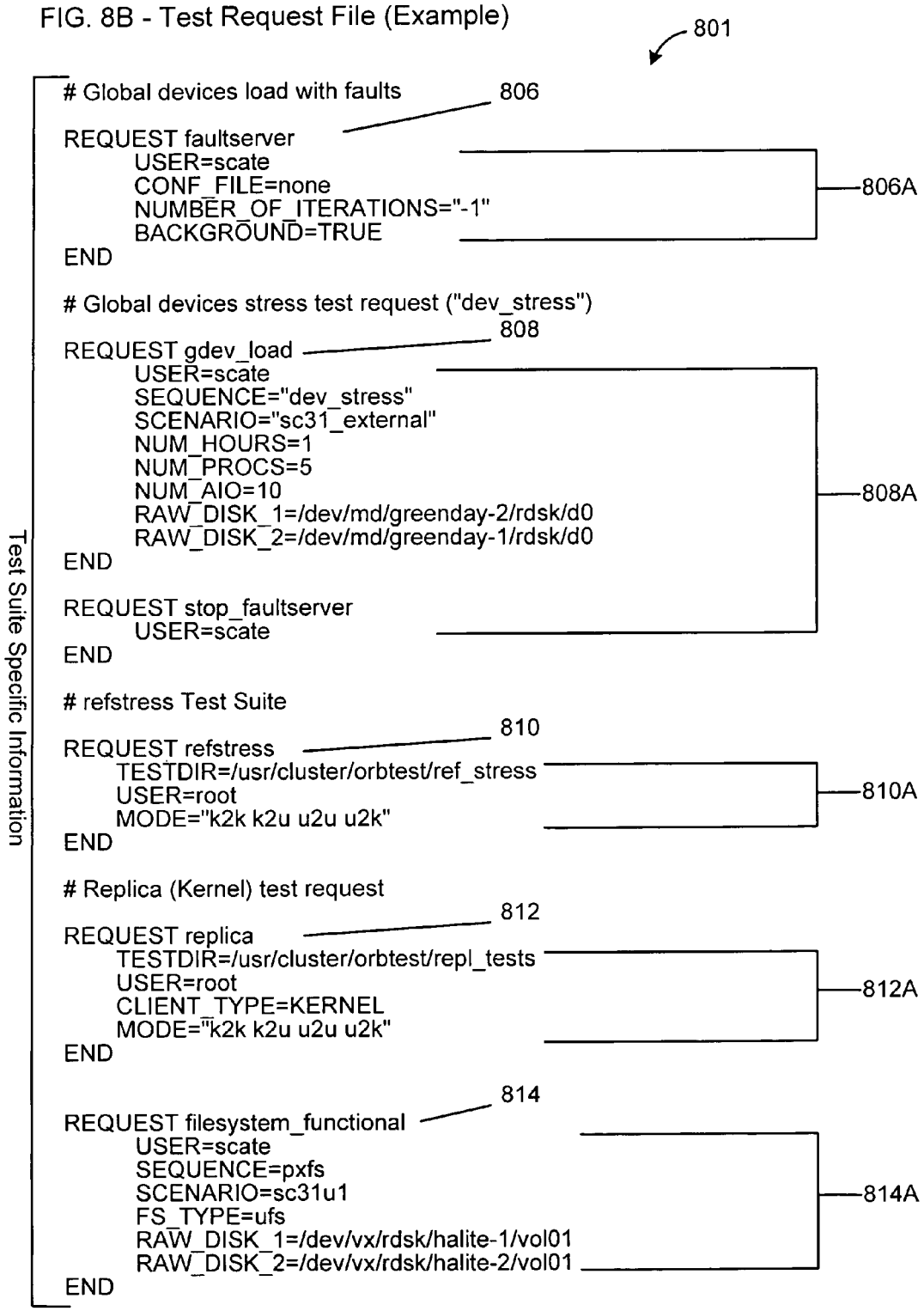

```
# Global devices load with faults                    806

REQUEST faultserver
    USER=scate
    CONF_FILE=none                                    806A
    NUMBER_OF_ITERATIONS="-1"
    BACKGROUND=TRUE
END

# Global devices stress test request ("dev_stress")
                                                 808
REQUEST gdev_load
    USER=scate
    SEQUENCE="dev_stress"
    SCENARIO="sc31_external"
    NUM_HOURS=1
    NUM_PROCS=5                                       808A
    NUM_AIO=10
    RAW_DISK_1=/dev/md/greenday-2/rdsk/d0
    RAW_DISK_2=/dev/md/greenday-1/rdsk/d0
END REQUEST stop_faultserver
    USER=scate
END refstress Test Suite
                                   810
REQUEST refstress
    TESTDIR=/usr/cluster/orbtest/ref_stress
    USER=root                                         810A
    MODE="k2k k2u u2u u2k"
END

# Replica (Kernel) test request
                                   812
REQUEST replica
    TESTDIR=/usr/cluster/orbtest/repl_tests
    USER=root                                         812A
    CLIENT_TYPE=KERNEL
    MODE="k2k k2u u2u u2k"
END 814
REQUEST filesystem_functional
    USER=scate
    SEQUENCE=pxfs
    SCENARIO=sc31u1                                   814A
    FS_TYPE=ufs
    RAW_DISK_1=/dev/vx/rdsk/halite-1/vol01
    RAW_DISK_2=/dev/vx/rdsk/halite-2/vol01
END
```

Test Suite Specific Information

FIG. 8C – Test Request File (Example)
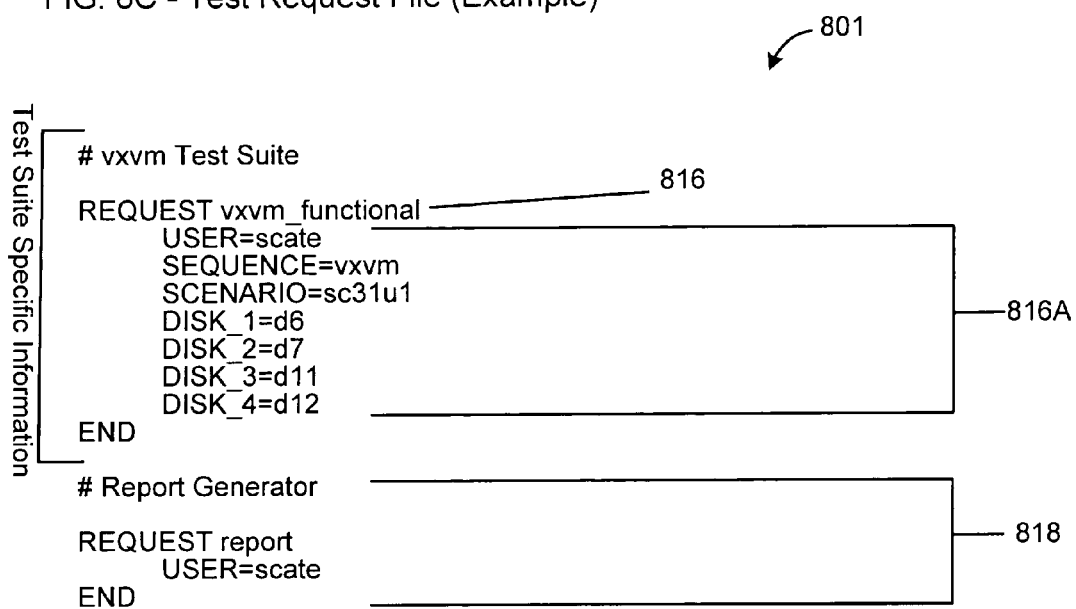
```
# vxvm Test Suite
REQUEST vxvm_functional                      ——— 816
    USER=scate
    SEQUENCE=vxvm
    SCENARIO=sc31u1
    DISK_1=d6                                        816A
    DISK_2=d7
    DISK_3=d11
    DISK_4=d12
END
Report Generator
REQUEST report                                ——— 818
    USER=scate
END
```
Test Suite Specific Information FIG. 9 - Test Report (Example)    ← 900

／942
Report Directory: /opt/SUNWscts/log/10-14-03_13.08.27_phys-greenday-1_22

Report Generated on 10-14-03 at 14:40:45 — 944

OVERALL STATUS:  FAIL — 902
==============

DETAILED STATUS — 940
==============
                                    ／906     ／908     ／910
Test Suite — 904                    Status   Start Time  End Time
----------                          ------   ----------  --------

Global Device Load Tests with Faults   FAIL    03:08:32   05:27:50 — 926
Cluster Filesystem Functional Tests    PASS    05:28:28   05:43:31 — 928
Global Device Functional Tests         PASS    05:46:41   06:28:53 — 930
Scalable Service Functional Tests      PASS    06:29:31   06:49:20 — 932
RGM Functional Tests                   PASS    06:51:20   06:57:42 — 934

SUMMARY OF FAILURES — 912
==============

TEST: Global Device Load Tests with Faults   — 914

Results Summary
---------------
      ／916     ／918      ／920       ／922
Test Case   Test No.   Current    Expected
---------   --------   -------    -------- stress_test    6        FAIL       PASS — 936

／924
Detailed Log Files
                                                                    ／938
/opt/SUNWscts/log/10-14-03_13.08.27_phys-greenday-1_22/2_dev_stress/results

==============

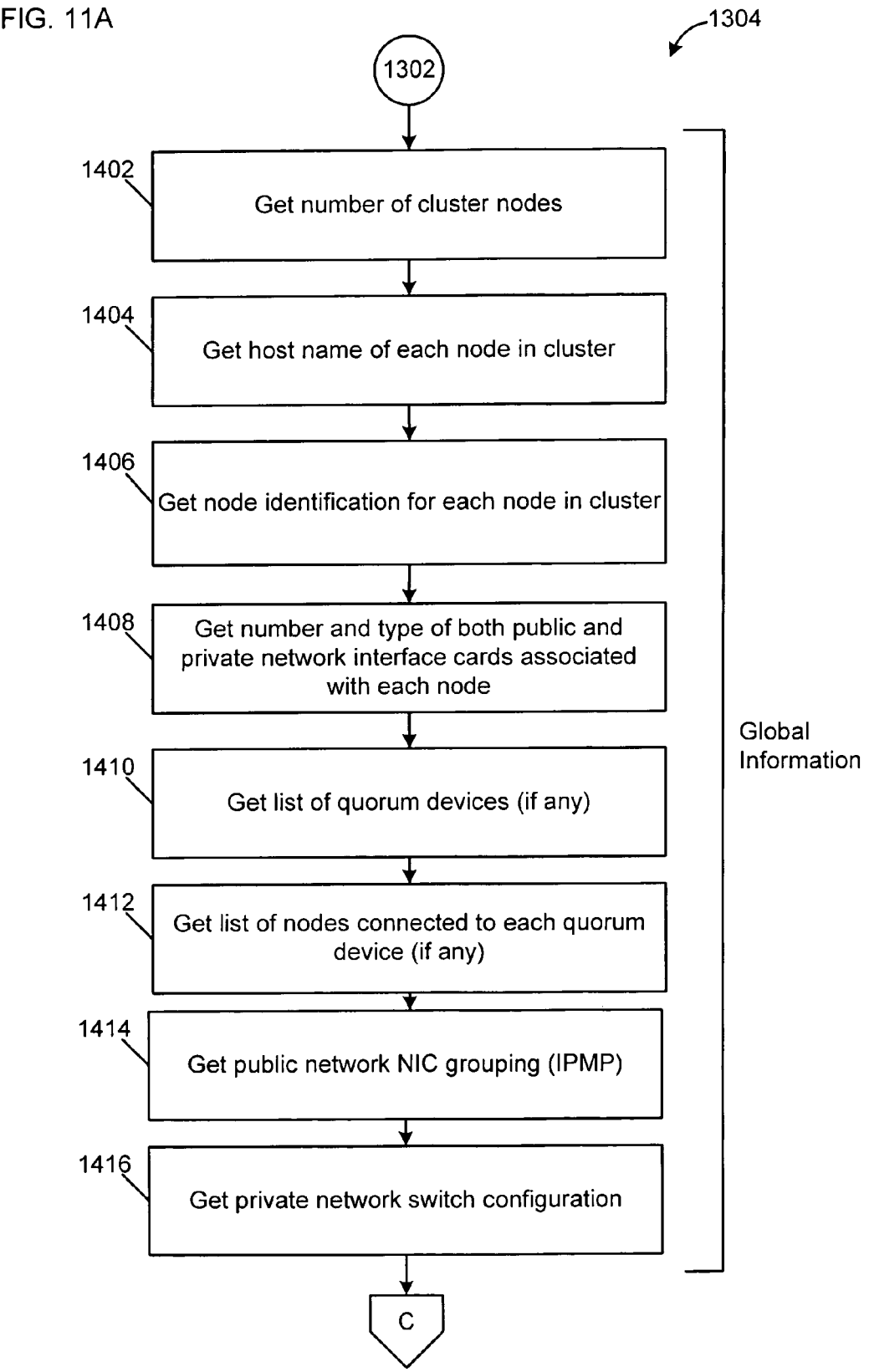

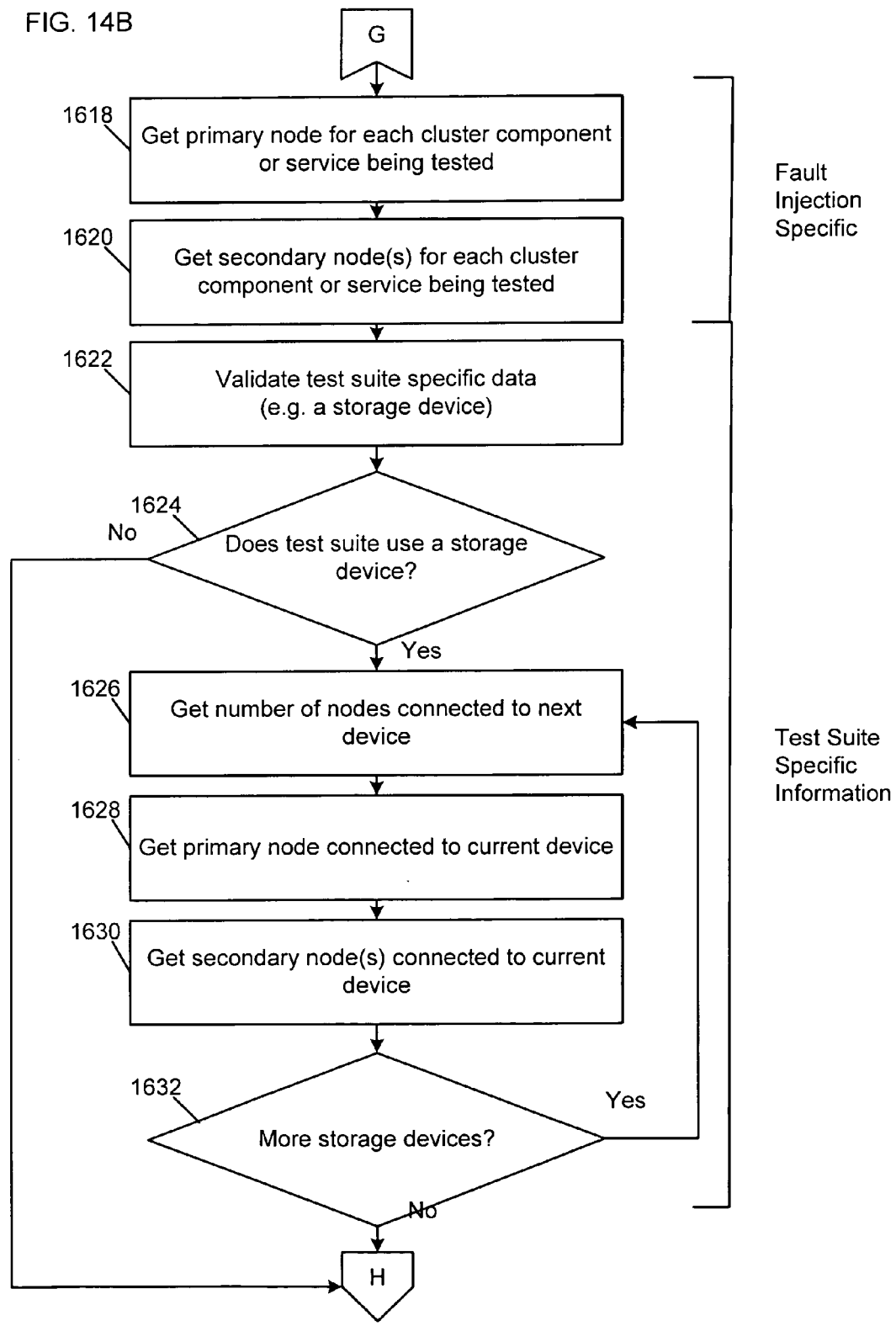

DISTRIBUTED TEST FRAMEWORK FOR CLUSTERED SYSTEMS

BACKGROUND

Computing clusters and other distributed computing systems have a number of requirements that go well beyond the requirements of stand alone computing systems. Therefore, when components are developed for use in clustered or distributed computing environments, it is typically necessary and desirable to test the component in such an environment. By way of example, if software (such as an application program, a cluster resource or a database) or hardware (such as a storage device, a processor or an interface card) is developed for use in a computing cluster, it is generally desirable to test such components in the cluster environment before releasing such components for sale.

To facilitate the testing of computer related components, test software (e.g., test programs or test suites) will typically be written that are designed to exercise the component to be tested in an environment similar to that in which the component will be used. In the context of clustered computing, this typically requires either that the author of the test software know a fair amount about the characteristics of the specific cluster that will be used to test the component, or that the engineer running the tests spend a significant amount of time installing, configuring and/or running the test software in order to execute the selected tests. Consequently, the testing of computing cluster related components is often very expensive and time consuming. Furthermore, in many cases, duplicate work is done since developers and engineers may be unaware of prior tests that have been performed for similar or identical computing cluster environments and components.

SUMMARY

In one aspect of the invention, a method for testing a computing cluster having a plurality of computing nodes is provided that receives selected configuration information regarding a test system. The method includes identifying at least one node of a computing cluster that is part of the test system; using systems operations to query selected components of the test system, including the computing cluster to obtain additional configuration information regarding the test system, including additional configuration information regarding the computing cluster; generating a configuration file based on the received and obtained configuration information; passing the configuration file to each computing machine in the test system; and launching a test suite on each computing machine in the test system required to perform the tests contemplated by the test suite.

In some embodiments, the method also includes at least one client computer. The client computer may be queried to obtain an associated IP address. In other embodiments, additional configuration information may be obtained from the computing cluster that includes a logical host name and a node ID for each node in the cluster. Furthermore, identification of network interface cards associated with each node may be obtained. Still further, the method may also provide information on devices connected with the cluster including: quorum devices, private network switches, public network switches, external clients, and storage devices.

The method may also include a test suite support module that includes a number of tools such as: a global information-gathering tool configured to collect global information associated with the computer cluster testing environment; information-gathering tools configured to collect test suite specific information associated with the computer cluster testing environment; and generic tools such as a summary report generation tool, a number of start-up tools, a synchronization tool, and a number of cleanup tools.

The start-up tools may also be configured to accommodate a variety of tasks configured to: create a file system of a predetermined size and type; mount the file system; create files and directories under the mounted file system; export the file system to a client machine; mount the exported file system on the client machine; and load a kernel. Other start-up tools may be configured to report the results of a test suite launched; and compare the results of the test suite launched with a predetermined data set.

BRIEF DESCRIPTION OF THE DRAWINGS

Embodiments of the invention may best be understood by reference to the following description taken in conjunction with the accompanying drawings in which:

FIG. 7 is an illustrative example of a detailed results log for several processes in accordance with an embodiment of the present invention.

FIGS. 8A–8C are illustrative examples of a sample test request file generated by an embodiment of the present invention.

FIG. 9 is an illustrative example of a sample test result report generated by an embodiment of the present invention.

FIGS. 11A–11C are process flow diagrams illustrating a suitable method of querying a computing cluster to obtain additional configuration information (step 1304 of FIG. 10A) in accordance with an embodiment of the present invention;

FIGS. 14A–14C are process flow diagrams illustrating a suitable method of querying a high availability computing cluster to obtain additional configuration information (step 1304 of FIG. 10A) in accordance with an embodiment of the present invention.

DETAILED DESCRIPTION

The invention will be described below in the context of a computing cluster. Computing clusters are available from a wide range of manufacturers, such as Sun Microsystems Inc., Hewlett Packard Inc., IBM Inc., SGI Inc., and so on. In one embodiment of the invention, a Sun™Cluster computing cluster, manufactured by Sun Microsystems, Inc. of Santa Clara, Calif., can be used. However, it should be realized that the invention can be applied in other types of computing cluster environments as well, and that the scope of the invention is not limited to a particular manufacturer's computing clusters, but is instead defined by the appended claims. Furthermore, the components to be tested in the computing cluster environment will be exemplified herein by distributed test framework for clustered systems. A cluster is a collection of loosely coupled computing nodes that provides a single client view of network services or application including databases, web services, and file services. Each cluster node is a standalone server that runs its own processes. These processes communicate with one another to form what looks like (to a network client) a single system that cooperatively provides applications, system resources, and data to users. From the user's perspective, clustered systems are highly available, that is, if part of the computing cluster fails, other parts of the computing cluster will take over the functionality of the failed part, so that the user notices virtually no difference, except for maybe a slight performance degradation.

Figure 1:
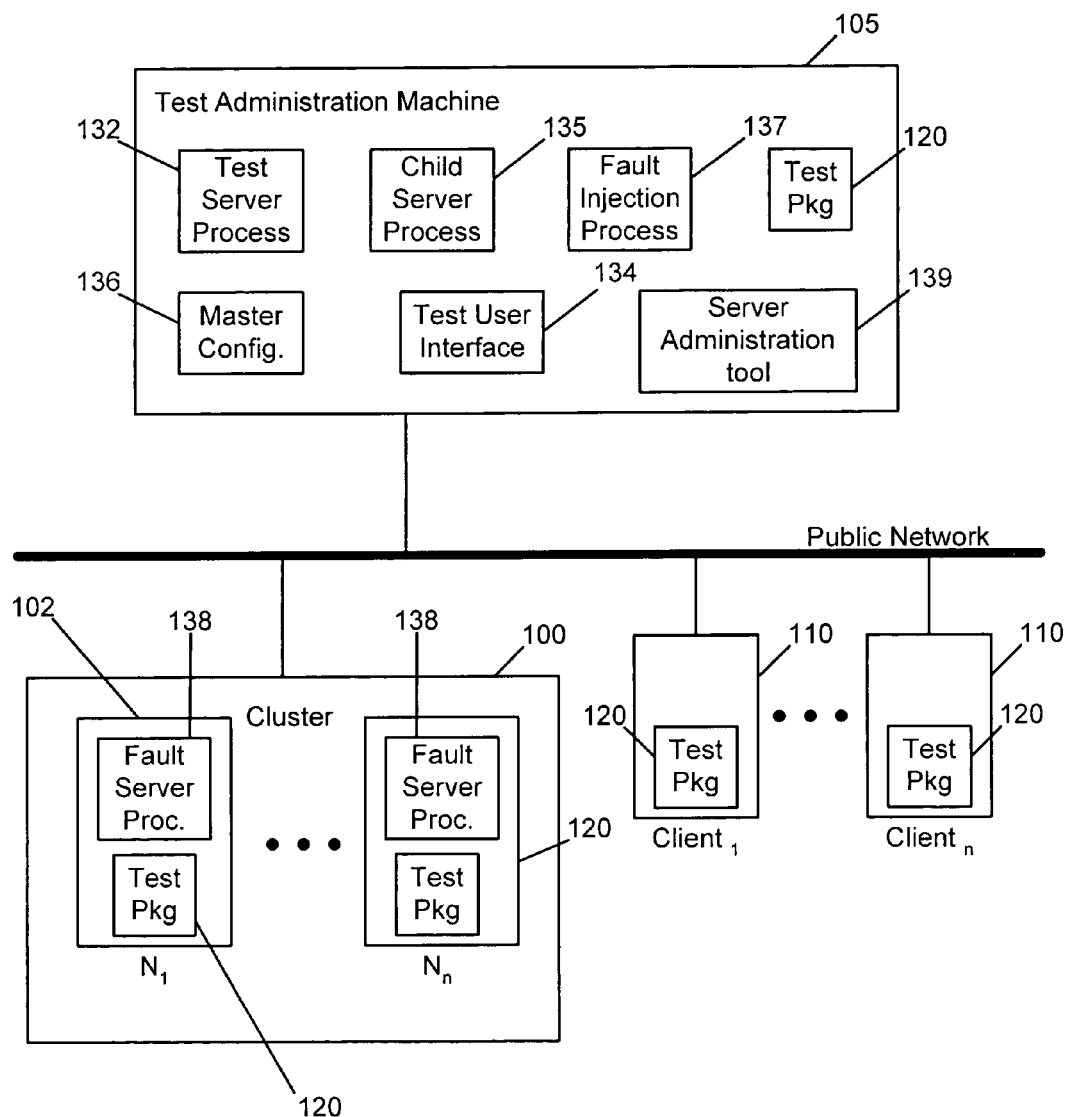
FIG. 1 is a diagrammatic representation of a test system in accordance with one embodiment of the present invention that is suitable for testing components in a computing cluster environment.

As shown in FIG. 1, a representative test system in accordance with the present invention that is suitable for testing components in a computing cluster environment will be described. The test system includes a cluster 100, a test administration machine 105 and potentially one or more client machines 110. As will be appreciated by those familiar with cluster based computing, the size, topology and components of different clusters may be widely varied. At a minimum, the cluster 100 will have multiple computing nodes 102 which are typically (although not necessarily) stand alone computer systems. Most computing clusters used today utilize in the range of 2–16 nodes, although it is expected that as the technology develops even larger clusters will become more common. The cluster may have a variety of components such as one or more storage devices, a quorum device, public network interface cards, storage interface devices, cluster interconnect devices, switches, console access devices, etc. By way of background, the Sun™Cluster 3.1 Concepts Guide dated October 2003, which is incorporated herein by reference, provides an overview of the concepts, components and topologies that are typical in one particular cluster architecture.

The test administration machine 105 is used to administrate the testing. In some types of tests, it is desirable to provide one or more test client machines 110 that interact with the cluster to simulate actual use scenarios. The number of test client machines (if any) that are appropriate for a particular test suite may vary widely from a single test client to hundreds or more test clients (although most test suites require the use of only a small number of test client machines and many do not require any test clients machines). The test administration machine 105 may be configured with a number of software components comprising: a test server process 132; a child server process 135, a fault injection process 137; a test package 120; a master configuration 136; a test user interface 134; and a server administration tool 139.

The wide variety of configurations and topologies that are possible within a cluster can present challenges from a test standpoint. This is due in part because the configuration and topology of the particular test cluster that will be used in a particular test may not always be known or clear when a test suite is developed. The test framework, packages and methods described below can be used to facilitate more automated testing of computing clusters and other distributed computing systems.

Referring again to FIG. 1, in one described embodiment, a test package 120 is provided that has a number of components. The actual components that make up the test package may vary widely. By way of example, in the embodiment illustrated in FIG. 2, the test package 120 includes a number of test suites 145, a configuration utility 148, a test server utility 151, a test request file generator 154, a report generator 157, a load statistics tool 158, and a system data gatherer tool 159.

Any number of test suites may be provided and the nature of the various test suites may be widely varied to provide any desired testing functionality. By way of example, the Sun™Cluster architecture has a number of resource components including a cluster membership monitor (CMM); a cluster configuration repository (CCR); a resource group manager (RGM); and a public network monitor (PNM). The cluster architecture also contemplates the use of a variety of hardware devices including storage devices; quorum devices; switches; storage interfaces; cluster interconnects; and network interfaces. Thus, the test package may include test suites that are designed to test the functionality of each of these (and other) components individually and/or in various combinations.

As will be appreciated by those familiar with component testing, there are several levels of functionality that are typically desirable to test and the test suites may be classified in a wide variety of manners. By way of example, in the context of cluster testing, some test suites may be basic functional tests designed to verify that a tested system configuration works as expected with cluster software. Other test suites may be classified as cluster load tests that are designed to verify that the tested system configuration works as expected with the cluster software under load. Still other test suites may be classified as fault injection tests that are arranged to verify that the tested system configuration works as expected with the cluster software in the presence of faults that simulate failures that can occur during normal cluster operations. Yet another class may be fault injection load tests, which are tests that are designed to inject faults while the cluster is experiencing a load. Of course, the various fault injection test suites may be designed to inject a wide variety faults internally within the cluster or externally in a client system. By way of example, some fault tests may simulate or cause a selected node, component or client to fail completely or partially. The simulated failures may be graceful (e.g., as exemplified by rebooting a node) or dramatic (as exemplified by simulating a sudden loss of power).

Often in order to more easily detect the source of problems, it is typically desirable to perform testing in a progressive manner. By way of example, in a particular test situation, it may be desirable to first perform functional tests and then proceed to load testing only when the system appears to be working fine in the functional tests. Thereafter fault injection tests may be performed only after the load testing has been successful, and so on.

From the standpoint of a manufacturer of cluster computing solutions, it may be desirable to provide a set of test suites that must be successfully completed in order to validate a product as being compatible with the manufacturer's cluster software. By way of example, it may be desirable to validate a storage device as being a cluster compatible storage product. Similarly, it may be desirable to provide sets of test suites that may be used to validate a cluster compatible application program, a cluster resource or a cluster hardware component. Of course, a variety of other validation classifications could be envisioned and may be desired in particular situations.

Figure 2:
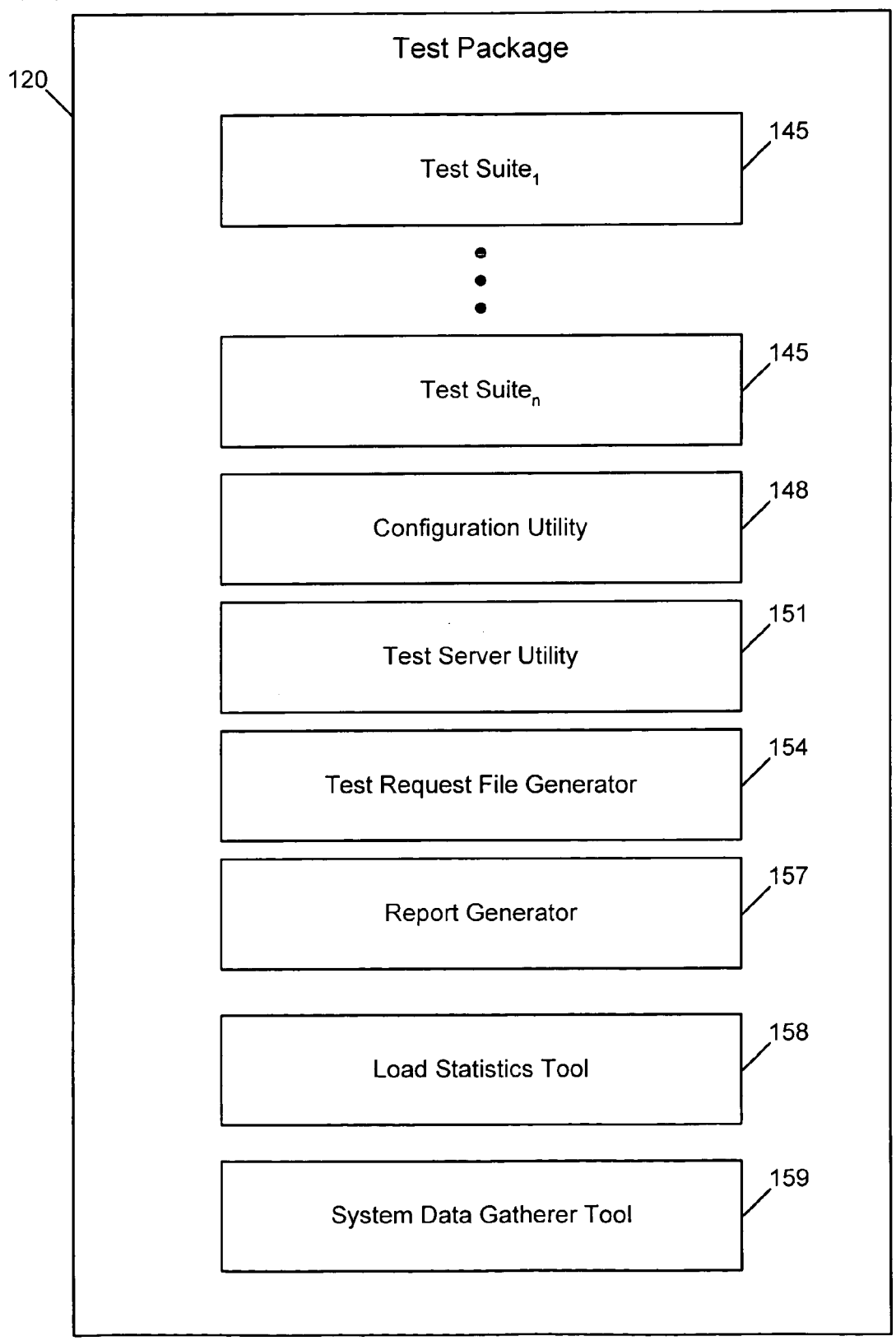
FIG. 2 is a diagrammatic representation of a test package in accordance with one embodiment of the present invention.

Referring to FIG. 2, in the described embodiment, a configuration utility 148 is arranged to collect any information that is required from the user to identify the cluster (and its component systems) and any client computers that are part of the test system, and to permit the user to select the test(s) that they would like to run. A test user interface may be arranged to call the configuration utility 148 as well as a test request file generator 154. A resulting test request file 801 of FIGS. 8A–8C is then passed to a test server utility 151.

The described test server utility 151 is arranged to automatically launch the selected test suites. The test server utility 151 may be arranged to use the test request file 801 to launch the various test suites as appropriate to automatically conduct the desired testing. The test server utility 151 may also include or invoke a report generator 157, a load statistics tool 158, and a system data gatherer tool 159. The report generator 157 may be arranged to produce a summary report indicative of the test results. By way of example, the summary report may be as simple as an indication of the tests run and an indication of whether the tests were passed or failed. The load statistics tool 158 may be arranged to launch a particular set of tools to generate statistical data relevant to the testing environment. Finally, the system data gatherer tool 159 may be configured to determine: operating system version and type; operating system version and type; server type; memory configuration; virtual memory configuration; hardware configuration; patch installation information; system initialization and cleanup script information; and system file administrative configuration.

Figure 3A:
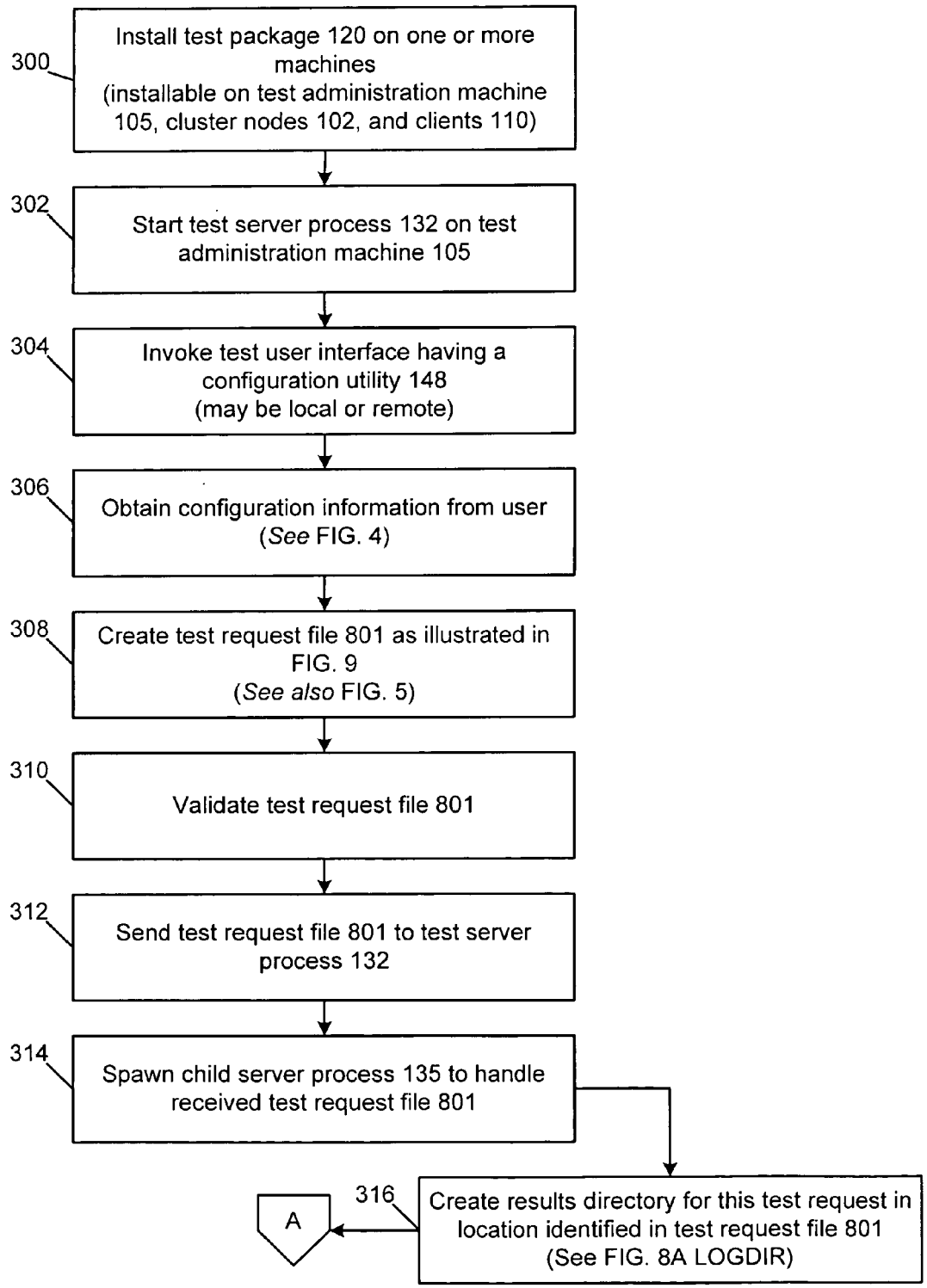
FIGS. 3A–3B are process flow diagrams illustrating a method of automatically testing a computing cluster in accordance with an embodiment of the present invention.
Figure 3B:
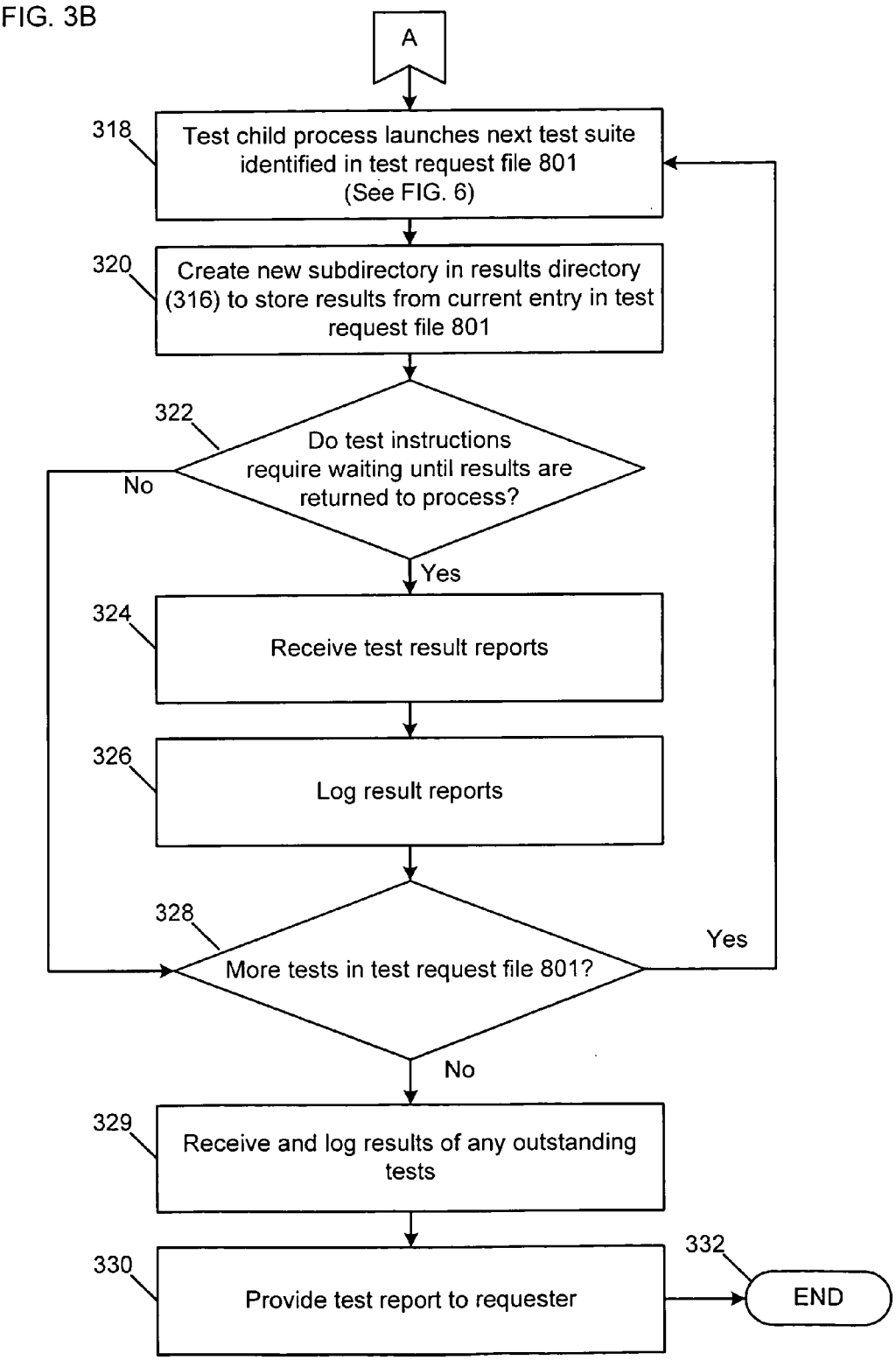

Additional details and benefits of the described test framework and test packages may be better understood by reference to the flow charts provided in FIGS. 3A–15B. FIGS. 3A–3B are flow diagrams illustrating a method of automatically testing a computing cluster in accordance with an embodiment of the present invention. Initially, at step 300, a test package (e.g., test package 120) is installed on one or more machines. In one embodiment, a test package 120 is installed on all machines in the test environment including, but not limited to the test administration machine 105, each of the clustered nodes 102 and any client machines 110 that are part of the test environment.

In the described embodiment, the test package 120 is arranged so that a substantially similar package may be installed on each of the machines in the test system. That is, it may be independently installed on the test administration machine 105, each cluster node 102 and each client system 110 used in the test system. This is not a requirement. Rather, customized test packages for the test administration machine, the cluster nodes and the clients could be provided. While such a customized approach has some advantages, having a single test package that is installed on all of the machines is generally simpler and easier for the testers to use and update. A fault server process 138 is additionally and independently installed on each of the cluster nodes.

After the test package 120 has been installed on all machines, it is ready for use. To initiate a test, the test server process 132 on the test administration machine 105 may be started as illustrated in Step 302. The test server process 132 may optionally be a daemon process that runs in the background on the test administration machine 105. As suggested above, the test server process 132 initiates, schedules, executes, and manages the automated tests. Once the test server process 132 is running, a user may invoke a test user interface 134 that includes the configuration utility 148 (step 304). In the described embodiment, the test user interface 134 may be invoked locally on the test administration machine or remotely. In this manner, ready access to the interface is achieved, thus simplifying administration of the cluster testing. Notably, the test administration machine 105 may also be configured to include a server administration tool 139 to administer the test server process 132. In particular, the server administration tool 139 may be arranged to query the status of the test server process 132 (e.g., determining number of test requests currently being processed, determining the duration of the test requests, determining current test requests) and to kill a given job or test request.

The user then inputs the necessary configuration information in step 306. This may include the identification of the components of the test system and the selection of the test suites that the user wishes to run. The configuration information can be obtained in any suitable manner. By way of example, the configuration information can be input as part of the test user interface command. Alternatively, the test user interface can be arranged to prompt the user to enter the necessary information. Other standard information gathering approaches can be used as well. One suitable method of collecting the necessary configuration (step 306) is described in further detail below with respect to FIG. 4. Once the configuration information has been obtained from the user, a test request file 801 is created (step 308) and validated (step 310). A suitable method for creating the test request file 801 (step 308) is described below with respect to FIG. 5 and a representative test request file 801 is illustrated in FIGS. 8A–8C.

Referring to FIGS. 8A–8C generally, the test request file 801 will have a global entries section 800, a test suite specific section 803 and a report generation section 818. In the illustrated embodiment, the global entries section 800 include entries that identify: a) a cluster node entry 226 that identifies one of the cluster nodes; b) a remote shell environment entry 227 that identifies the type of remote shell environment operating on the nodes to be tested; c) a results directory location entry 224 that identifies where a log of the results is to be stored; and d) a client list section 228 that identifies the clients that are part of the test system. By way of example, the cluster node and the clients may be identified by their host names or addresses.

The test suite specific section 803 includes the calls arranged to launch each of the test suites that have been selected by the user. In the illustrated test request file 801, several tests are referenced. These include: a component level load test 802; an application load test 804; a global load test with faults 806; a global load test 808; a kernel component test 810; a replica kernel test 812; a component level file system test 814; and a component level volume manager test 816. It should be noted that these tests are illustrative examples and that it is generally contemplated that a wide variety of other tests would be available that can be included a test request file 801 as selected by the user. The section of the test request file 801 corresponding to each test includes the configuration entries or environment variables 802A–816A corresponding to each test.

Referring back to FIG. 3A, after the test request file 801 is created at step 308, it is validated at step 310. Validation is well known in the art and may be accomplished in any of a number of methods. Syntactical and logical constructs may be validated by comparison to known values or to known ranges of values. Further, the user may be prompted and reprompted in any of a number of different manners to either add missing data, components and/or tests to the test request file 801 or to confirm missing data, components and/or tests of the test request file 801. Although validation is explicitly illustrated in the example embodiment of FIG. 3A, additional validation steps may be employed at other steps without departing from the present invention.

After the test request file 801 has been validated, it is sent to the test server process 132 in step 312. As discussed above, in the illustrated embodiment, the test server process 132 may be a daemon process that runs on the test administration machine 105. As such, the test server process 132 remains running during the entire testing program. Thus, the test request file 801 generated in steps 304–310 is simply sent from the user to the test server process 132. The test server process 132 then spawns a test child process 135 to handle the test request file at step 314. The test child process 135 spawned in this embodiment is a dedicated process on the test administration machine 105 that will independently process the test request file 801. That is, in the present example, both the test server process 132 and the test child process 135—are resident on the test administration machine 105. The test server process 132 continues to run in the background and processes further test request files from users (including the initial user) while the test child process 135 is a dedicated test server process that processes a particular test request file 801. When the test request file 801 is fully processed, the test child process 135 is terminated. It should be appreciated that in alternative embodiments, the test server process 132 could process the test request file itself. One advantage of spawning a separate child process for each test request file is that is then easier for a single test server process to simultaneously monitor multiple test systems.

After the test child process 135 is spawned at step 314, it first creates a results directory at the results directory location entry 224 identified in the global entries section 800 of the test request file 801. The results directory is the location where the test result log files will be stored. It is expected that in most cases, the test suites will log the results of the various tests that are executed and the results directory is simply the location where those results will be stored. The desired location of the test results directory is one of the elements provided in the test request file 801. Generally, the directory location may be a user defined location or a default location.

After the test results directory has been created, the test child process 135 launches the first test suite identified in the test request file 801 at step 318. This is generally accomplished by sending appropriate invocation requests to each node in the cluster and any (each) client that will be used by the selected test suite. A suitable method of launching a test suite is described in further detail below with respect to FIG. 6 and the actions taken by the launched test suites on the cluster nodes and clients is described in further detail below with respect to FIGS. 10A–15B. In the described embodiment, each of the cluster nodes and clients has the same test package 120 installed thereon and therefore has all of the code necessary to run its part of the desired test.

After the test child process 135 launches the first test suite, a new subdirectory is created in the results directory that was created at step 316 to store the results from the current test in the test request file 801 (step 320). In one embodiment of the present invention, the subdirectory is automatically entered, for example, by creating the subdirectory using the name of the associated test suite as the subdirectory file name. In other embodiments, the user may select subdirectory naming conventions that are automatically entered or may define the subdirectory names individually.

In many circumstances it is desirable to run a single test at a time, while in other situations it might be desirable to run multiple tests simultaneously. By way of example, it is generally preferable to run most functional tests independently, whereas many load tests contemplate running multiple tests simultaneously in order to test for faults that may appear when the system is under a load. This variation is conceptually represented as decision block 322 of FIG. 3B. In the described embodiment, each test suite includes instructions that indicate whether to wait until the test results are back before launching the next test suite identified in the test request file.

Generally, if the instructions for a particular test request file require waiting (e.g., the decision at block 322 is yes), then the child process 135 effectively waits until it receives the test results report back from each of the components (i.e., cluster nodes and clients) that are involved in the test (step 324) and logs the received test result reports as represented by step 326. It should be appreciated that the test result reports may be logged in any suitable order. For example, they may be logged sequentially as they come in, or the child process may hold the results until all of the test results are received before they are logged. In the described embodiment, there are at least two logs generated at step 326. These include a detailed results log containing data from all the tests from all the machines utilized by the current test suite, and a summary results log containing only the pass/fail results for each test in the test suite. Because the detailed results log may contain many hundreds of lines of test data, the summary results log is particularly useful to quickly assess the outcome of the tests. FIG. 7 illustrates examples of a detailed results log for several processes 206–212. In particular, $field_1$, $field_2$, $field_3$, . . . $field_n$ may be comprised of any of a number of data corresponding both to the test (e.g., 214–218) of interest and the environmental variables (e.g., 220–222) of the test running.

After the test results are all received and logged, a determination is made as to whether the test request file 801 identifies any additional tests to be executed (step 328). If so, the logic returns to step 318 where the next test suite identified in the test request file is launched in the same manner just described and the process continues iteratively until all of the test suites identified in the test request file have been executed.

In some circumstances, it will not be desirable to wait for the current test to complete its execution prior to launching the next test. In those situations, (which are represented by the "no waiting" path from decision block 322) the child process 135 will proceed to launch the next identified test suite if any additional tests are required. In the flowchart of FIG. 3B, this is represented by jumping directly to step 328 where a determination is made as to whether there are any additional tests to be run and if so, back to step 318 where the next test suite is launched. When all of the tests have been launched, the determination at decision block 328 will be that there are no more tests in the test request file and the logic will proceed to step 329 where it waits to receive and log the results of all outstanding tests (if any).

It should be appreciated that with the described architecture, the test suite developer can readily define the number of test suites to be run simultaneously simply by designating whether or not to wait after each test suite is launched and by controlling the order of execution of the test suites.

Once all of the tests in the test request file 801 have been launched and completed, any outstanding test results are received and logged at step 329. Thereafter, in step 330 a summary test report 900 is generated and returned to the test server process, which in turn may be designed to return the results to the requester. After returning the summary test report, the test request file 801 is fully processed and the child process 135 may be terminated.

An illustrative example of a summary test report is illustrated in FIG. 9. The test report 900 includes a number of illustrative example fields that are useful in reporting the results of a given test suite module. A Report Directory field 942 is a report directory obtained in step 502 (FIG. 4) along with the subdirectory created in step 316 (FIG. 3A). A Report Generated field 944 reports the date and time stamp of the test report. An Overall Status field 902 indicates the status of the cumulative test results. In this example, the status indicated is "FAIL." Failure is indicated when any one of the several test suites invoked fail. That is, unless a "PASS" is indicated on all tests, the status will indicate, "FAIL." The Detailed Status header 940 precedes the details of the test suites that were invoked. In this example, five test suites 926–934 were invoked. Each test suite has an associated Status field 906, Start Time 908, and End Time 910. Notably, in this instance, none of the test suites were concurrent. In other embodiments, multiple test suites may be run concurrently. In still other embodiments, more parameters may be selected for the test suites by the user. A Summary of Failures header 912 precedes the details of the individual tests that failed in this example. In this instance, the Global Device Load Tests with Faults 914 test suite is being summarized. In particular, one of the tests in that test suite, namely the stress_test test indicated by the Test Case field 916, failed as indicated by the Current field 920. The Test No. field 918 indicates the order in which the test proceeded in the test suite. The order in which a test is invoked may assist the user in troubleshooting the system by detecting potential test conflicts or data corruption. The order will also assist the user in locating the specific test data in the detailed log file, which, as noted above, can be lengthy. An Expected field 922 indicates what the user expected outcome of the test will be. Finally, the Detailed Log Files field 924 indicates the location by directory of the detailed log files of the tests summarized in this report. As noted above, the location and naming conventions are limited only by the particular operating system under which the tests are being invoked.

Step 306—Obtain Configuration Information from User (All Systems)

Figure 4:
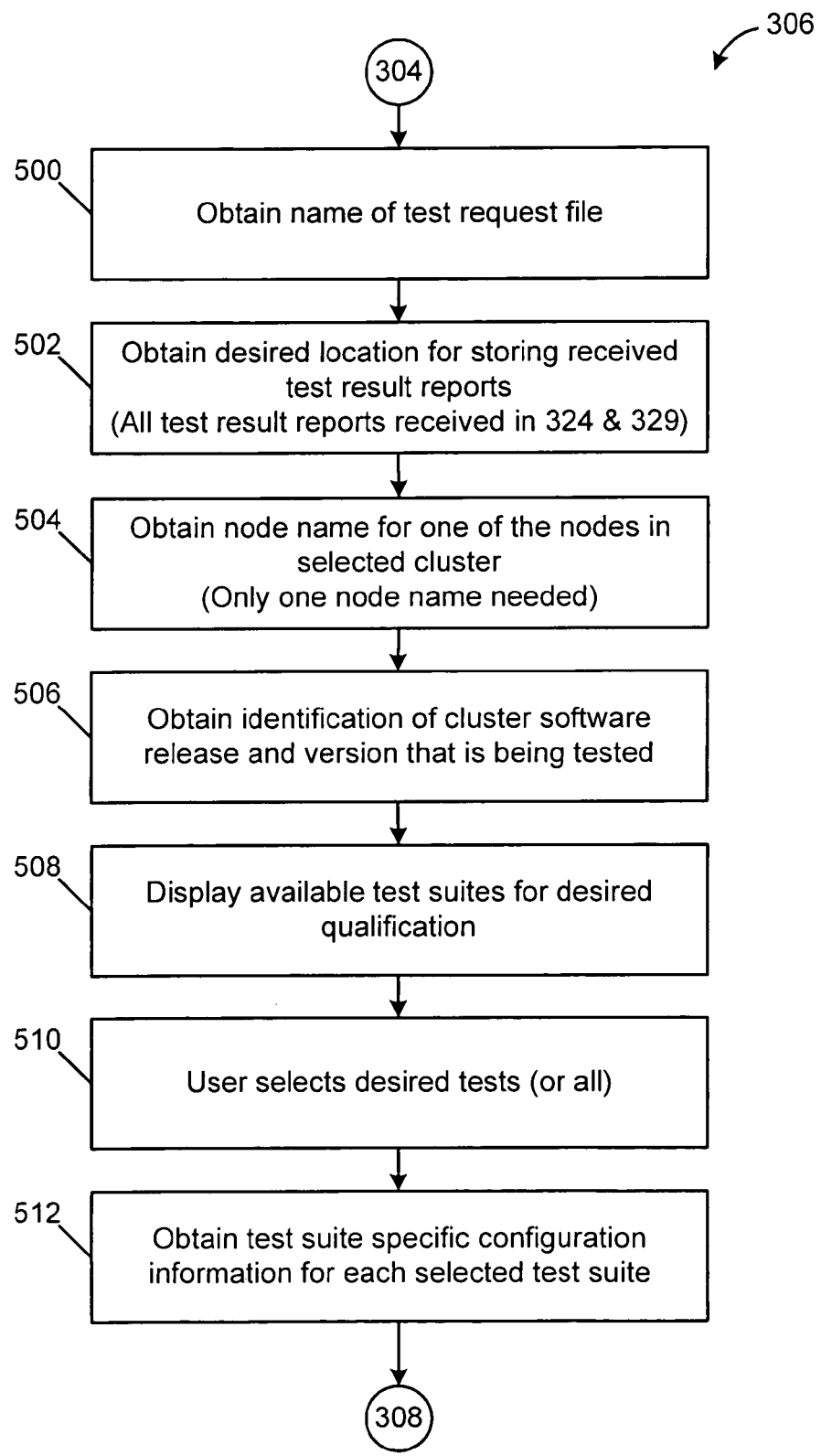
FIG. 4 is a process flow diagram illustrating a suitable method of obtaining configuration information from a user (step 306 of FIG. 3A) in accordance with an embodiment of the present invention.

FIG. 4 is a process flow diagram illustrating a suitable method of obtaining configuration information from a user (step 306 of FIG. 3A) in accordance with an embodiment of the present invention. It should be appreciated that the ordering of the various information gathering steps is not important and depending upon the needs of a particular system, some of these steps may be ignored and others added. In the initial step 500 of the illustrated approach, the name of the test request file is obtained. The user may input any name for the test request file so long as the name is a valid name under the file system used on the host machine. Typically, a user will select a name that is descriptive of the test request file such as the name of the test requested or the component tested. However, there are relatively few restrictions on naming conventions. In the event that the user does not desire to input a user-defined name for the test request file, a unique default name may be entered by the interface. For example:

Default Name=testrequest<number>.out

In this illustrative example, if no previous results files are found, the default name will be set to testrequest1.out. If the directory all ready contains a file named testrequest1.out, the default name will be set to testrequest2.out. Thus, the default name may be serially incremented over preexisting file names.

In a next step 502, the desired location for storing received test result reports is obtained from the user. The user may optionally select an appropriate directory subject to the operating system requirements. However, like the obtaining the name of the test request file of step 500, a default directory location may be entered if the user elects not to specifically name the destination directory. The default directory can contain a datestamp_timestamp field corresponding to the current date and time as well as a method field corresponding to the selected test or method invoked. Within the test request results file, various result fields corresponding to a variety of user specified fields (or user interface specified fields) are stored. Any number of fields may be utilized according to user preference or according to the particular values received by the test server process 132.

At a next step 504, a node name for one of the nodes in a user-selected cluster of interest is obtained. Because each cluster node is a standalone server that runs its own processes, the cluster nodes communicate with one another to form what looks like (to a network client) a single system that cooperatively provides applications, system resources, and data to users. As such, all nodes in a cluster are grouped under a common logical name—the cluster name—which is used for identifying the cluster. Thus, selection of a node name for one of the nodes of the cluster allows the test server process 132 to identify the remaining nodes under the common cluster. For example, if a user wants to test a node of interest, but does not know the name of the particular node, but knows the name of another node in the cluster, then the desired node name may be extracted from the known node name. After a node name has been obtained, the release and version identification of the cluster software that is being tested is obtained at step 506. In one example embodiment, the test server process 132 may use one or more clustering and operating system tools to gather all the static information of the cluster like topology, private interconnections, public interconnections, or other cluster information such as release and version information. In other embodiments, the user may select the release and version information from a menu or list supplied by the user interface. Network software deployment is not always uniform. That is, within a distributed environment, several different versions or releases of software may reside on different nodes within the same cluster. Because the different software releases may contain conflicting code, the test server process 132 must assure that the selected test is matched to a particular release version and is invoked to avoid software crashes or data corruption.

When the release and version of the cluster software being tested is identified, the process proceeds to display the available test suites for the desired qualification at step 508. Several qualifications may be available to the user in an example embodiment including, but not limited to: storage qualification, server platform qualification, private interconnect qualification, public network qualification, and individual cluster component validations. As a general matter, qualification describes the process by which components and their physical and logical arrangements are tested for compliance with a particular manufacturer's specification. Each of the listed qualifications may be selected separately or in combination without restriction at a step 510. As can be appreciated by one skilled in the art, the user interface may present various options for selection including a drop-down menu, pop-up banner, dialog box, and scrolling menu, etc. without departing from the present invention. Available options may be keyed to the software release and version while non-conforming options may be either non-selectable or unavailable to the user.

Finally, in obtaining configuration information from the user 306, test suite configuration information for each selected test suite is obtained at step 512. The test suite configuration information, in an example embodiment of the present invention, may include without limitation: host name/s for client machines, storage devices to be used, and/or logical host names for the selected cluster. The configuration information may be obtained by any of a variety of methods such as menu driven user selectable criteria; automated information gathering; or user entry. Matching the test suite to the appropriate configuration information is essential to maintaining test data integrity. In other embodiments, the user may be prompted to supply additional identifying indicia that may be utilized by a particular test suite. After all the configuration information has been obtained under steps 500 to 512, the process proceeds to create a test request file 801 (FIG. 3A, step 308).

Step 308—Create Test Request File

Figure 5:
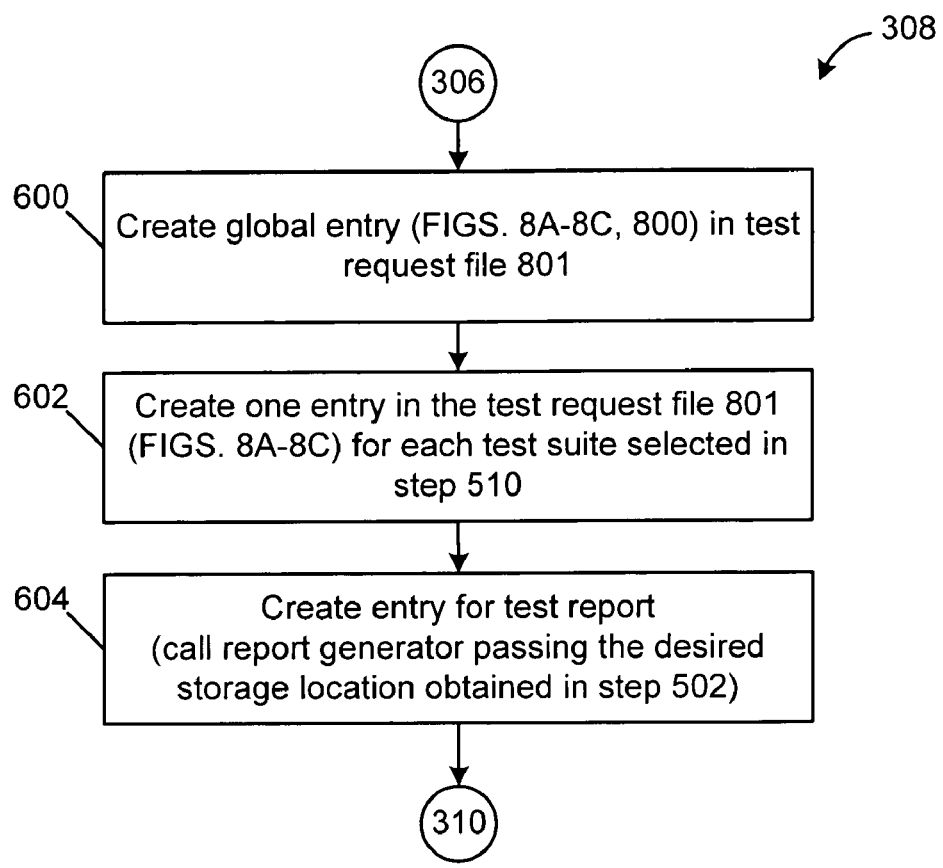
FIG. 5 is a process flow diagram illustrating a suitable method of creating a test request file (step 308 of FIG. 3A) in accordance with an embodiment of the present invention.

FIG. 5 is a process flow diagram illustrating a method of creating a test request file 801 in accordance with an embodiment of the present invention. Thus, a first step 600 of creating a test request file 801 (step 308) is creating a global entry 800 in a test request file 801 (FIGS. 8A–8C). A global entry comprises several data fields. In one example as illustrated in FIGS. 8A–8C, global entry data fields 800 comprise: a directory location field 224 indicating the location of the test results file; a node name field 226 indicating a node of interest in the selected cluster at step 504 (FIG. 5); a remote shell environment indicating the shell upon which the node is operating 227; and a client field 228, where appropriate, indicating a client of interest connected to the cluster of interest. Notably, the directory location field 224 is created from the user input or default input of step 502 (FIG. 4) as discussed above. Global entry fields 800 will be discussed in further detail below for step 318 of FIG. 6.

Referring back to FIG. 5, after the global entry is created in the test request file at step 600, one entry for each test suite selected at step 510 is created at step 602. Referring briefly to FIG. 7, FIG. 7 is an illustrative example of several requests. For example, a start_faults request 214, a gdev_load request 216, and a stop_faults request 218 are illus-trated. Each of the requests may contain one or more arguments that are passed when the test request is processed. In the illustrative example, a dont_wait=true argument 220, and a dont_wait=false argument 222 are passed with the corresponding requests 214–216. More particularly, the dont_wait=true argument 220 indicates that the test child process 135 will launch the start_faults request 214 and proceed with launching of the next request in the file gdev_load 216 request in the example. The start_faults request 214 will be running in the background while other requests are being initiated. Alternatively, dont_wait=false argument 222 under that gdev_load request 216 indicates that the test child server process 135 will launch gdev_load test and wait until the gdev_load test results are returned to the test child process before initiating the next test. As can be appreciated by one skilled in the art, many different arguments may be passed at this step depending on the nature of the test requested, the component or application tested, and the release and version of the cluster software used. Other example test requests 802–816 are illustrated in FIGS. 8A–8C, which will be discussed in further detail below for step 318.

In a final step of creating a test request file 801, an entry for the test report 818 is created at step 604. Operatively, a report generator is called and the desired storage location is passed. Note that the desired location passed is the directory location field 224 (FIGS. 8A–8C) that is created from the user input or default input of step 502 (FIG. 4). The report generator identifies the test report in step 330 by traversing the sub-directories created in step 320 as will be discussed in further detail below. Further, without the test report entry 818, a final report is not generated.

Step 318—Test Child Process Launches Next Test Suite (all Systems)

Figure 6:
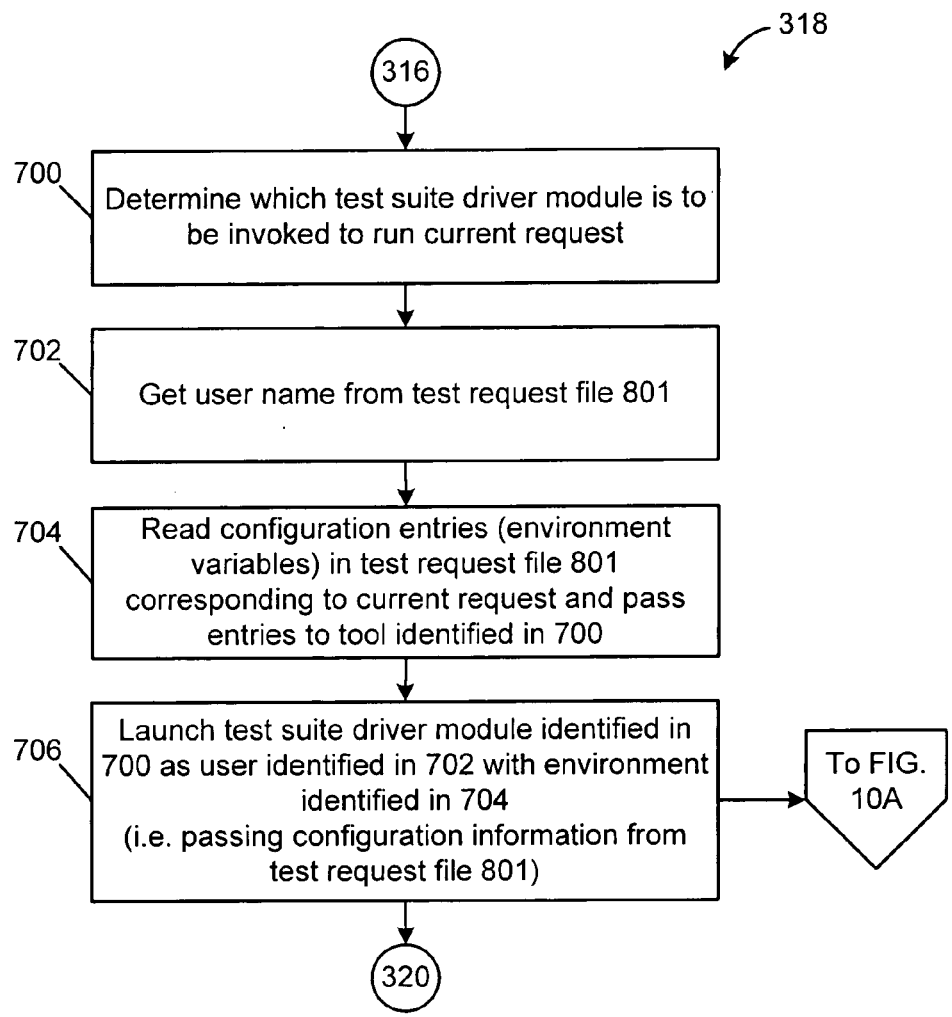
FIG. 6 is a process flow diagram illustrating a method of launching a test suite (step 318 of FIG. 3B) in accordance with an embodiment of the present invention.

The following discussion will refer both to FIGS. 6 and 8A–8C. FIG. 6 is a process flow diagram illustrating a method of launching test suites (step 318) in accordance with an embodiment of the present invention. FIGS. 8A–8C are an illustrative example of a test request file 801 generated by an embodiment of the present invention. Referring first to FIGS. 8A–8C, several tests are indicated: a component level load test 802; an application load test 804; a faults test 806; a global device load test 808; a kernel component test 810; a replica kernel test 812; a component level file system test 814; and a component level volume manager test 816. It should be noted that these examples are illustrative only and not intended to be limiting. Many other tests are available that may be a part of a test request file 801 as selected by the user. Further illustrated are configuration entries or environment variables 802A–816A corresponding to each test. Finally, as noted above, example global entries 800 and an example test report entry 818 are illustrated herein.

Referring to FIG. 6, at a first step 700, a tool is determined and invoked to run the current test request. For example, in the present embodiment, the start_stresser test 802 (FIGS. 8A–8C) is an example component level load test. Therefore, in this example, an appropriate tool is selected that can process the environment variables 802A within the start_stresser test 802 such that test data may be generated in response to the testing process. In likewise manner, tools exist for the remaining test examples 804–816 that can process the corresponding environmental variables 804A–816A. Tools are generally selected by consulting a mapping table that maps a particular test to a particular tool in a 1:1 manner although in some embodiments a user may select a tool locally. A user name is then read from the test request file 801 at step 702. The user name may be found in any number of sections in the test request file 801 (e.g., 802A, 804A, 806, 808, and 818). Any user name may be utilized that conforms to the particular naming conventions required by the operating system. Notably, the user name may be globally or locally overwritten.

In a following step 704, the environment variables 802A–816A are read and passed to the tools identified in step 700. The environment variables are configuration entries that describe the sub-systems being tested. Some of the variables may be automatically retrieved and others may be user defined. As noted above, a validation step 310 may prompt and reprompt the user to provide or recognize selected entries. As such, a user may selectively override a particular environment variable if necessary although this type of action may result in loss of test integrity. After the environment variables are read and passed to the tool identified in step 700, the tool identified in step 700 is launched as the user identified in step 702 with the environment variables identified in step 704 at a step 706 thus completing step 318 of FIG. 3B.

Non-Fault Injected Systems

Step 706—Child Server Process 135 Testing

Figure 10A:
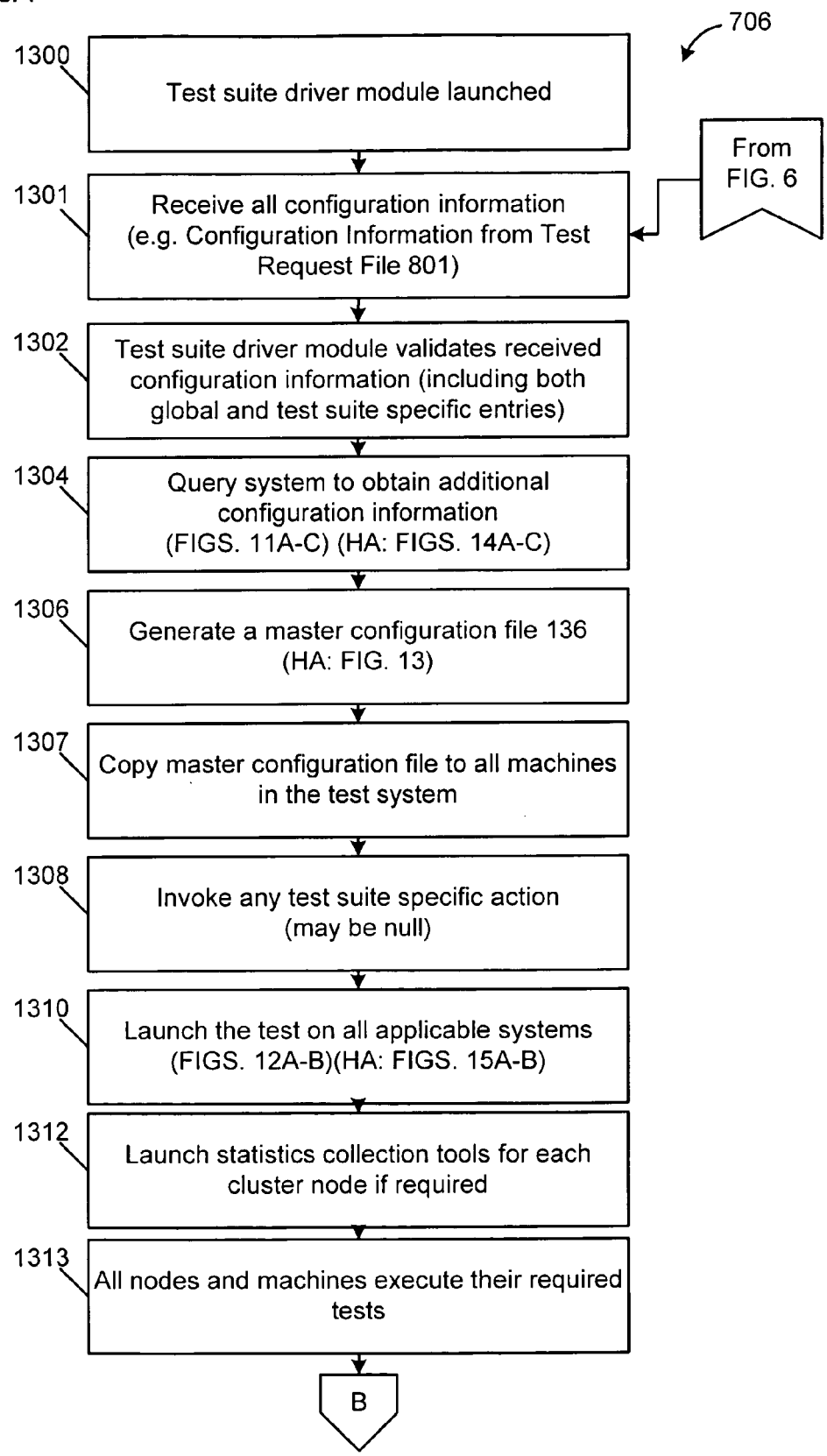
FIGS. 10A–10B are process flow diagrams illustrating a framework that a test suite may use to test a computing cluster in accordance with another aspect of the present invention.
Figure 10B:
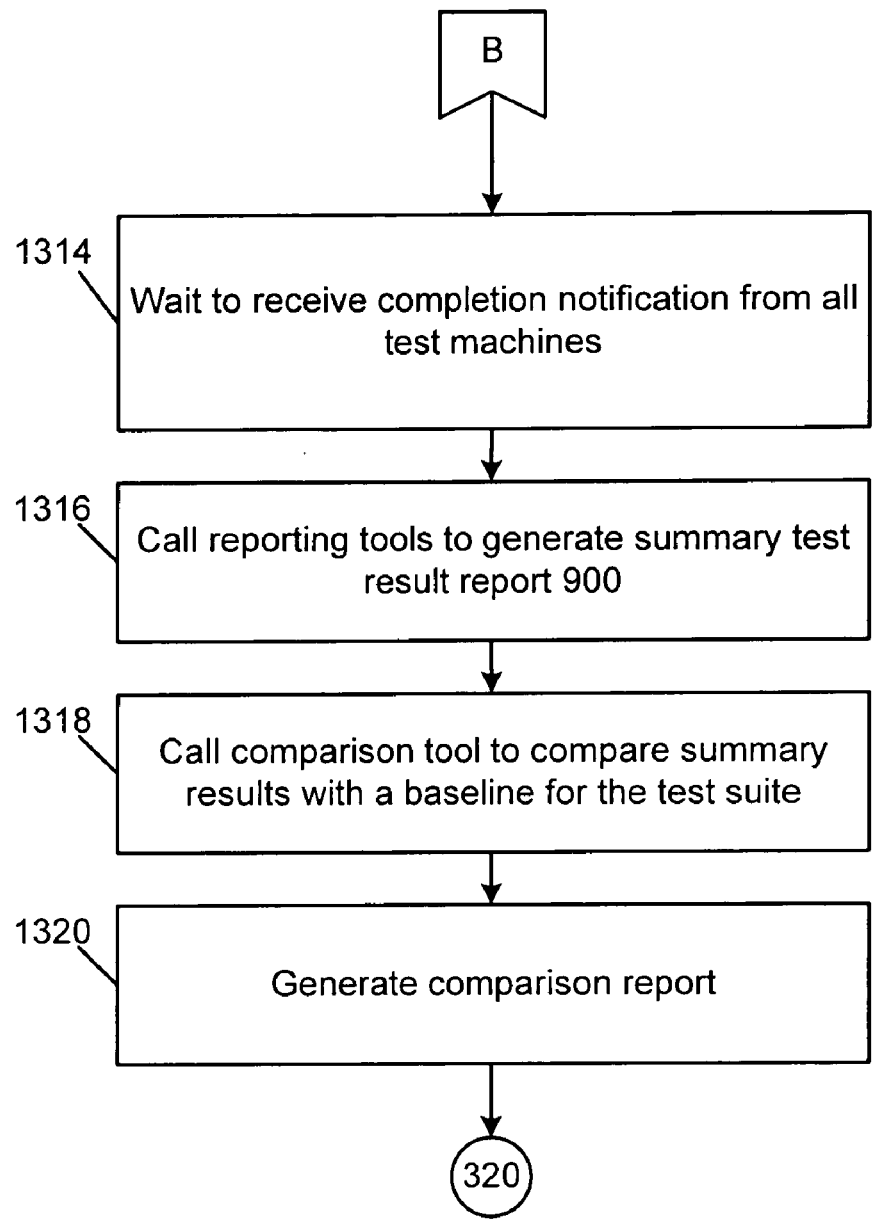

As noted above for FIG. 6, a child server process 135 launches the test suite driver module identified in step 700 as the user identified in step 702 with the environment identified in step 704. Referring to FIGS. 10A–10B, FIGS. 10A–10B are process flow diagrams illustrating a method of testing a computing cluster having a plurality of computing nodes in accordance with an embodiment of the present invention. In particular, step 706 is described in further detail with respect to FIGS. 10A–10B. In FIG. 10A, the child server process 135 calls a test suite driver module for a selected test suite identified by the test request file 801 at step 1300 and then passes the configuration information obtained at step 512 in FIG. 4 in a next step 1301. As noted above, configuration information includes the identification of the components of the test system corresponding to the test suites selected by the user. In particular, the configuration information includes the identification of at least one node of the computing cluster of interest. Once the configuration information has passed to the test suite driver module, the information is validated to ensure data integrity at step 1302. As noted above, validation is well known in the art and may be accomplished in any of a number of methods. Syntactical and logical constructs may be validated by comparison to known values or to known ranges of values.

Once the configuration information including both global and test suite specific entries are validated, the test driver module queries the system to obtain additional configuration information at step 1304. As can be appreciated, the test driver module may obtain many different types of configuration information. For example, the test driver module may query: each client computer to obtain an IP address associated with the client computer; the computing cluster to obtain the host name and node ID for each node in the cluster; the cluster to determine the identification of the type of each network interface card associated with each cluster node; the cluster to identify the type and connection of any quorum devices associated with the cluster; and the cluster to determine the identification of a private network switch configuration associated with the cluster of interest. In many instances, the user may not know all of the configuration information or, at a minimum, that information may be difficult or impossible to obtain remotely. By querying the system, a complete profile of the system is possible so that the test suite may correctly access and test each component of the system. Step 1304 is discussed in further detail below with respect to FIGS. 11A–11C.

A master configuration file 136 is then generated with all the obtained configuration information including the user-defined information and the queried information at step 1306. That file (master configuration file 136) may then be copied to all the computing machines in the test system at step 1307. In this manner, the configuration information is locally available to all machines. Thus, each test package 120 that is deployed on every machine in the test system retains local access to all the configuration information needed to properly execute all tests in the selected test suites.

The method then invokes any test suite specific action at step 1308. This step assures that any necessary preparatory steps may be handled before the actual test is run. The value may be a null where there are no test suite specific actions to be executed. There exist many other examples of test suite specific actions like rebooting, configuring an application, mounting file systems, and clearing caches that are contemplated by the invention described herein. This step also increases the modularity of the system because test suite specific actions are separated from more generic actions that may be reused in a different test. For example, if a load test is required, the generation of the load may be generic to a variety of test suites. However, there may be test specific actions required to target a specific nodal topology. In this manner, a load test action may be reutilized across many test suites, while the application to a particular topology may require non-generic actions. Once the test suite specific actions are completed, the tests are launched on all applicable systems at step 1310. As noted above for step 322, wait states may be required between different tests. The focus here, however, is the methodology by which an individual test driver module completes its tests. Further, step 1310 will be discussed in further detail below with reference to FIGS. 12A–12B.

When all tests are launched on all applicable systems, a statistics collection tool for each cluster node is launched if required. The statistics collection tool may generate data from a variety of different sources well known in the art on a particular application. Statistic collections tools typically collect information on how well the system of interest is utilized. Example statistics include CPU statistics, I/O statistics, network statistics, etc.

All nodes and machines then execute the tests at step 1313 and, once those tests are complete, await notification of completion for all test machines at step 1314 before calling the reporting tools to generate the summary test result report 900 at step 1316. An example summary test result report 900 is discussed in further detail above for FIG. 9. A comparison tool may be called to compare summary test results with an established baseline for the test suite at step 1318. This step allows the user to determine whether the tested machines comply within an established standard. Furthermore, comparison provides a powerful tool for evaluating selected changes to a system be they experimental or diagnostic in nature. A comparison report is generated at step 1320 whereupon the method continues at step 320.

Step 1304—Obtain Additional Configuration Information

Figure 11B:
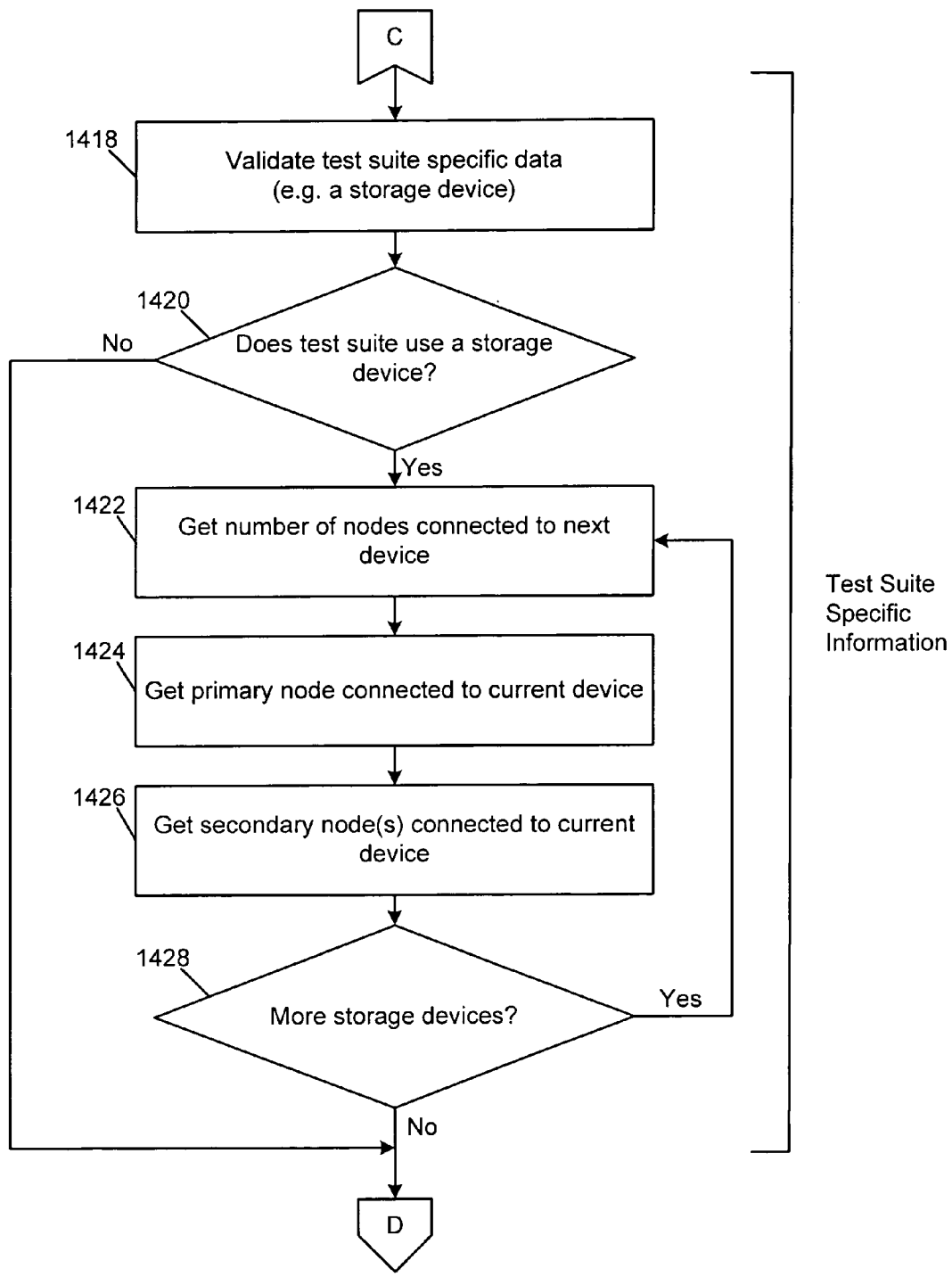
Figure 11C:
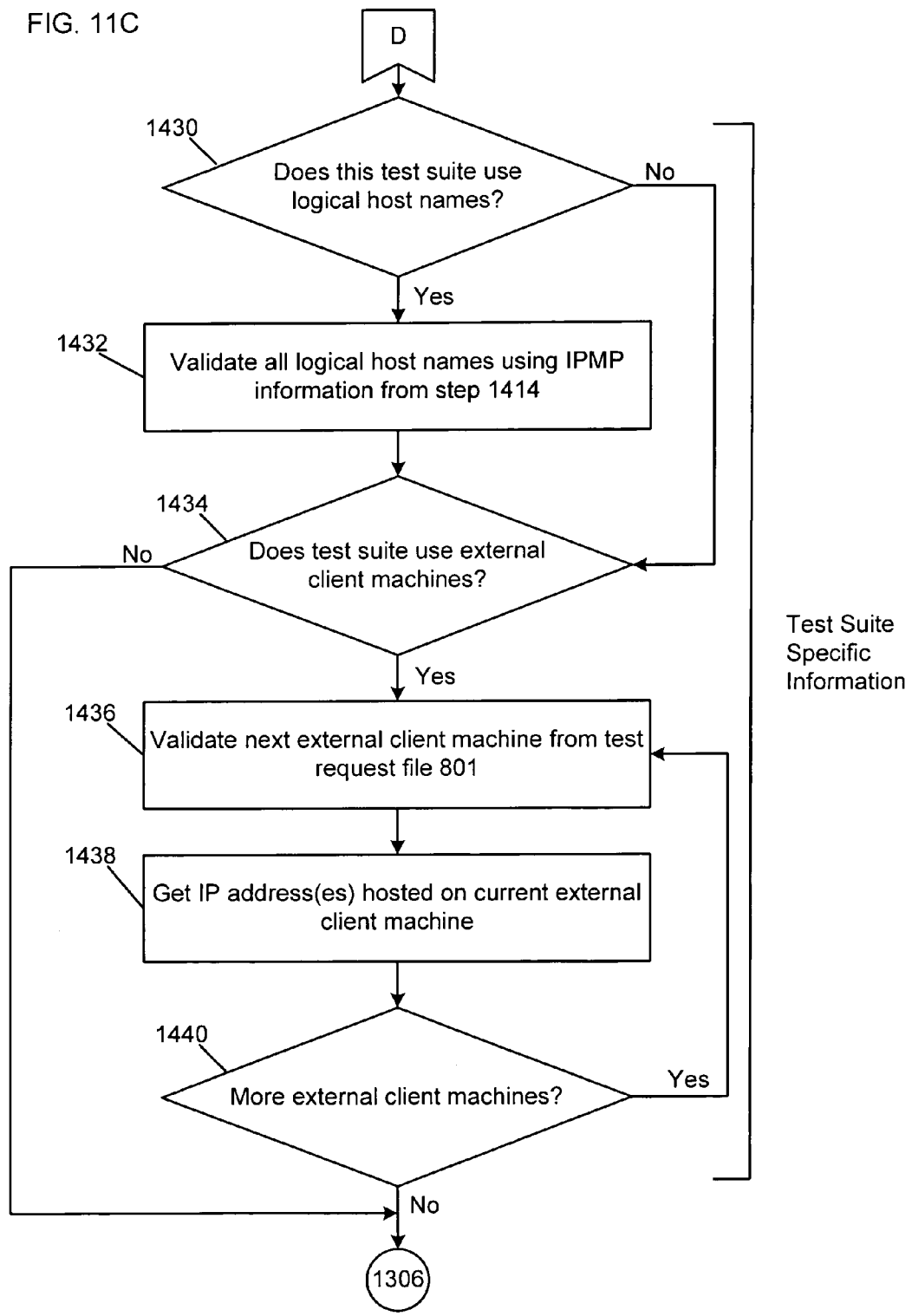

As noted above, the test driver module may obtain many different types of configuration information. This configuration information may be classified into two general categories: Global Information and Test Suite Specific Information. Global Information generally comprises information about devices that are available to the whole cluster. For example, a global device is a device that is accessible from all cluster members (nodes 100) such as a disk, CD-ROM, or tape device. Referring to FIGS. 11A–11C, FIGS. 11A–11C are process flow diagrams illustrating a method of querying a computing cluster to obtain additional configuration information in accordance with an embodiment of the present invention. With reference to FIG. 11A, some example global information obtained as contemplated in the present invention comprises: the number of nodes (step 1402); the host name of each node in a cluster (step 1404); the node identification for each node in the cluster (step 1406); the number and type of both public and private network interface cards associated with each node (step 1408); the list of quorum devices associated with the cluster if any (step 1410); the list of nodes connected with each quorum device if any (step 1412); the public network NIC grouping (IPMP) (step 1414); and the private network switch configuration (step 1416). Notably, IPMP can be described as software that uses fault monitoring and failover to prevent loss of service availability because of a single network adapter or cable failure in an IPMP group. The IPMP group is a set of one or more network adapters on the same node on the same subnet configured to back up one another in the event of an adapter failure. It can be appreciated that all of this information may be manually retrieved by the user as well as automatically by the present invention. Further, as noted above, the additional information obtained by the test suite driver module provides a more complete profile of the system being tested so that test integrity may be preserved.

A second type of configuration information obtained is test suite specific information. With reference to FIGS. 11B and 11C, examples of test suite specific information may comprise three types: storage device information (step 1420 et seq.); logical host name information (step 1430 et seq.); and external client machine information (step 1434 et seq.). For a first type of example information—storage device information—the test system is queried first to determine whether any storage devices are being used at step 1420. If there are no storage devices used by the test suite, the process continues to obtain the next level of information. If there are storage devices being used by the test suite, the method proceeds to get the number of nodes connected to the device (step 1424); to get the primary node connected to the current device (step 1424); and to get the secondary node or nodes connected to the current device (step 1426). The method continues to query for storage device information until all the storage devices are accounted for at which point the method escapes the iterative loop at step 1428. For a second type of example information—logical host name information—the test system is queried first to determine whether the test suite uses logical host names at step 1430. If the test suite does not use logical host names, the process continues to obtain the next level of information. If the test suite uses logical host names, then the logical host names are validated using Internet Protocol Network Multipathing (IPMP) information from step 1414 at step 1432.

For a third type of example information—external client machine information—the test system is queried to determine whether the test suite uses external client machines at step 1434. If there are no external client machines being used by the test suite, the method continues to step 1306, which is described above. If the test suite uses external client machines, the external client machine is validated from information contained in the test request file 801 at step 1436. Once the external client machine is validated, the IP address(es) hosted on the external client machines are obtained at step 1438. The method continues obtaining external client machine information until all the external client machines in the test system have been queried at which time the method proceeds to step 1306, which is described in further detail above. Notably, other types of configuration information may be gathered in manner similar to that described above as the framework described herein allows expansion to include any other new entity of interest.

Step 1310—Launch Tests on all Applicable Systems

Figure 12A:
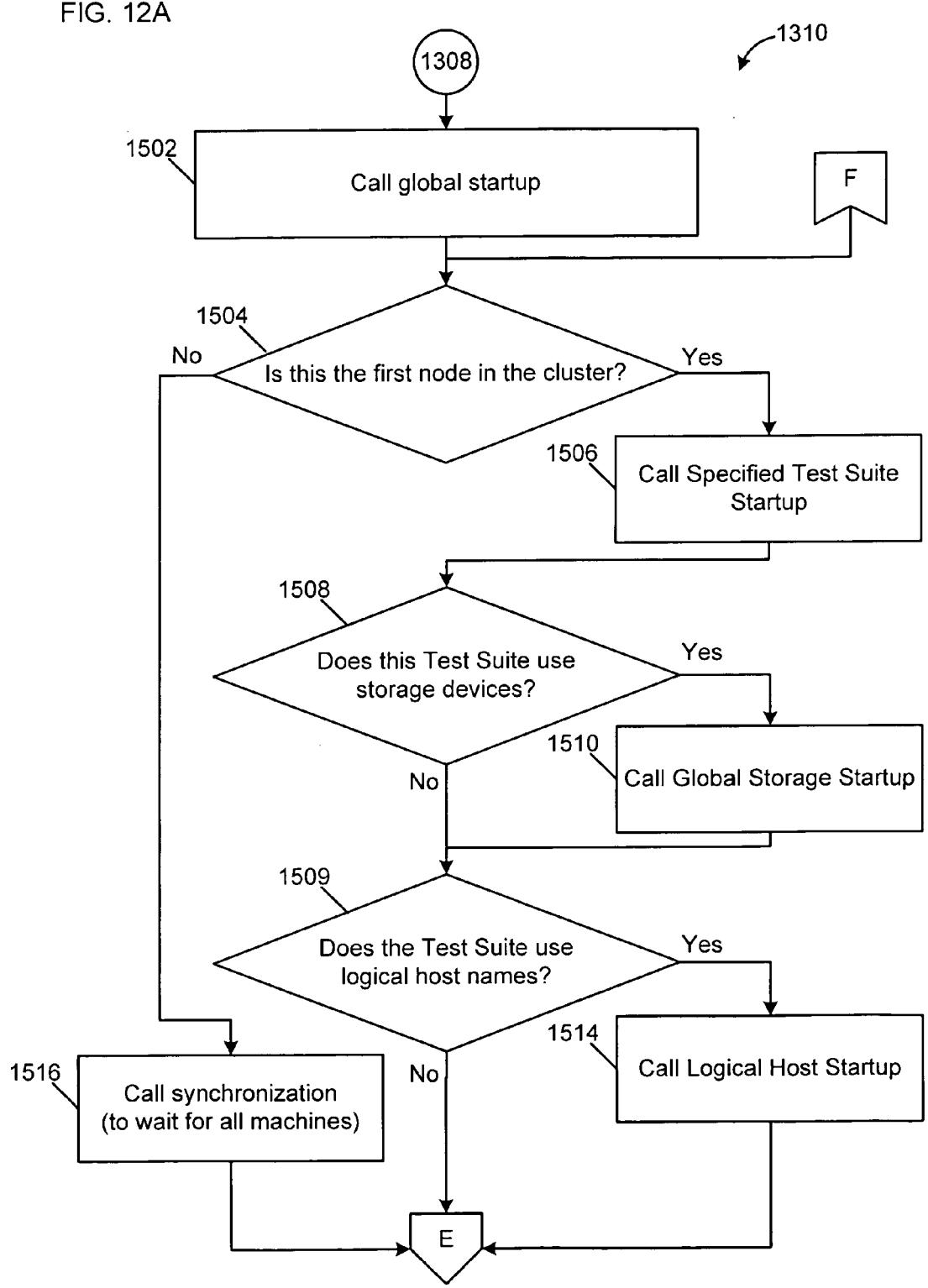
FIGS. 12A–12B are process flow diagrams illustrating a suitable method of launching tests in a computing cluster having a plurality of computing nodes (step 1310 of FIG. 10A) in accordance with an embodiment of the present invention.
Figure 12B:
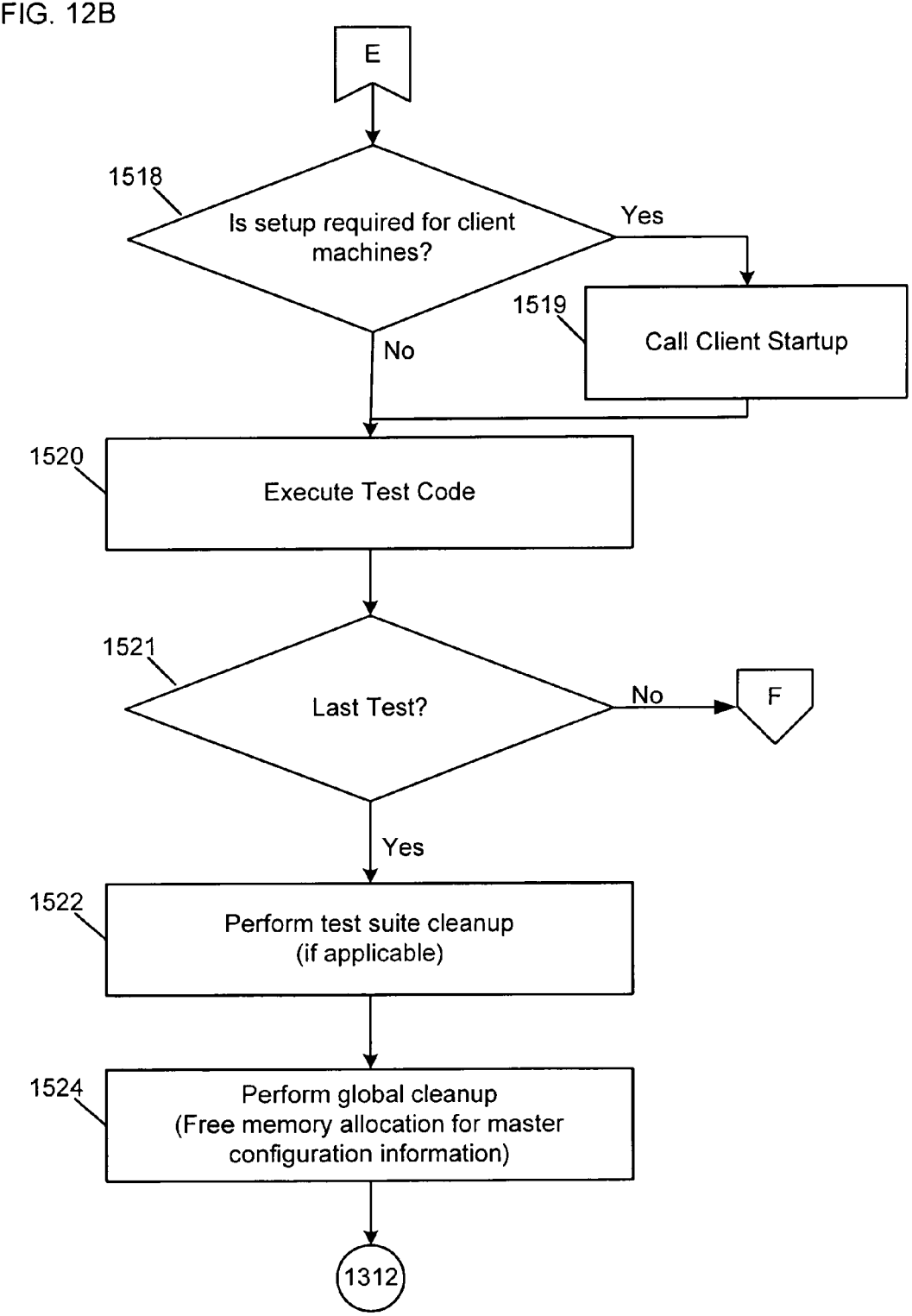

In step 1304 as described in detail above, various types of information are obtained through an automated query process. That information is particularly useful when launching the test on all applicable systems in step 1310. Turning to FIGS. 12A–12B, FIGS. 12A–12B are process flow diagrams illustrating a method of launching tests in a computing cluster having a plurality of computing nodes in accordance with an embodiment of the present invention. At a first step 1502, global startup is called on the test administration machine 105. Generally, global startup reads configuration file information and loads the information into memory variables that are later freed during a cleanup step described below (e.g., steps 1522 and 1524). Once all the devices of interest are online, the method determines whether the first node is being accessed at step 1504. If the first node is being accessed, the test suite startup is called at step 1506 and determinations of whether the test suite uses storage devices and logical host names at steps 1508 and 1509 respectively are made. If storage devices and logical host names are being used, then the global storage startup and logical host startup processes are called in steps 1510 and 1514 respectively to utilize the relevant information. If, at step 1504, it is determined that the machine being queried is not the first node in the cluster, then the method calls a synchronization process that establishes a wait state until all machines are available for testing at a step 1516.

Once all the machines are available for testing the method determines whether setup is required for client machines at a step 1518. If client machine setup is necessary, the client startup is called at step 1519 and the method continues at step 1520. The method then executes the test code at step 1520. If another test is required at step 1521, the method returns to step 1504 and repeats until the last test has been executed. At that time, test suite cleanup (step 1522) and global cleanup (step 1524) are performed where applicable. Cleanup allows the freeing up of memory allocated during the startup phase so that the tested machines may return to normal functions or may be subjected to further testing.

Fault Injected Systems

High availability systems are characterized by the ability of a cluster to survive any single software or hardware failure in the system. Furthermore, in a highly available framework, most resources are recovered transparently to the applications using the resource. Thus, for example, if a cluster node fails, the highly available framework may detect the node failure quickly and create a new equivalent server for the framework resources on a remaining node in the cluster. At no time are all framework resources unavailable. Framework resources unaffected by a crashed node may be fully available during recovery. Furthermore, framework resources of the failed node may become available as soon as they are recovered so that a recovered resource does not have to wait for all other framework resources to complete their recovery. In some example embodiments, it is desirable to include fault injection to test high availability systems. The following sections describe methods for testing systems using fault injection techniques.

Step 706—Child Server Process 135 Testing

As noted above for FIG. 6, a child server process 135 launches the test suite driver module identified in step 700 as the user identified in step 702 with the environment identified in step 704. Referring to FIGS. 10A–10B, FIGS. 10A–10B are process flow diagrams illustrating a method of testing a computing cluster having a plurality of computing nodes in accordance with an embodiment of the present invention. In particular, step 706 is described in further detail with respect to FIGS. 10A–10B. Notably, step 706 for both non-fault injection and fault injection systems are substantially similar differing generally at steps 1304, 1306, and 1310.

In FIG. 10A, the child server process 135 calls a test suite driver module for a selected test suite identified by the test request file 801 at step 1300 and then passes the configuration information obtained at step 512 in FIG. 4 in a next step 1301. As noted above, configuration information includes the identification of the components of the test system corresponding to the test suites selected by the user. In particular, the configuration information includes the identification of at least one node of the computing cluster of interest. Once the configuration information has passed to the test suite driver module, the information is validated to ensure data integrity at step 1302. As noted above, validation is well known in the art and may be accomplished in any of a number of methods. Syntactical and logical constructs may be validated by comparison to known values or to known ranges of values.

Once the configuration information including both global and test suite specific entries are validated, the test driver module queries the system to obtain additional configuration information at step 1304. As can be appreciated, the test driver module may obtain many different types of configuration information. For example, the test driver module may query: each client computer to obtain an IP address associated with the client computer; the computing cluster to obtain the host name and node ID for each node in the cluster; the cluster to determine the identification of the type of each network interface card associated with each cluster node; the cluster to identify the type and connection of any quorum devices associated with the cluster; and the cluster to determine the identification of a private network switch configuration associated with the cluster of interest. In many instances, the user may not know all of the configuration information or, at a minimum, that information may be difficult or impossible to obtain remotely. By querying the system, a complete profile of the system is possible so that the test suite may correctly access and test each component of the system. Step 1304 is discussed in further detail below with respect to FIGS. 14A–14C for high availability systems.

A master configuration file 136 is then generated with all the obtained configuration information including the user-defined information and the queried information at step 1306. That file (master configuration file 136) is then copied to all the computing machines in the test system at step 1307. In this manner, the configuration information is locally available to all machines. Thus, each test package 120 that is deployed on every machine in the test system retains local access to all the configuration information needed to properly execute all tests in the selected test suites. Step 1306 is discussed in further detail below with respect to FIG. 13 for high availability systems.

The method then invokes any test suite specific action at step 1308. This step assures that any necessary preparatory steps may be handled before the actual test is run. The value may be a null where there are no test suite specific actions to be executed. There exist many other examples of test suite specific actions like rebooting, configuring an application, mounting file systems, and clearing caches that are contemplated by the invention described herein. This step also increases the modularity of the system because test suite specific actions are separated from more generic actions that may be reused in a different test. For example, if a load test is required, the generation of the load may be generic to a variety of test suites. However, there may be test specific actions required to target a specific nodal topology. In this manner, a load test action may be reutilized across many test suites, while the application to a particular topology may require non-generic actions. Once the test suite specific actions are completed, the tests are launched on all applicable systems at step 1310. As noted above for step 322, wait states may be required between different tests. The focus here, however, is the methodology by which an individual test driver module completes its tests. Step 1310 is discussed in further detail below with respect to FIGS. 15A–15B for high availability systems.

When all tests are launched on all applicable systems, a statistics collection tool for each cluster node is launched if required. The statistics collection tool may generate data from a variety of different sources well known in the art on a particular application. Statistic collections tools typically collect information on how well the system of interest is utilized. Example statistics include CPU statistics, I/O statistics, network statistics, etc.

All designated nodes and machines then execute the tests at step 1313 and, once those tests are complete, await notification of completion for all test machines at step 1314 before calling the reporting tools to generate the summary test result report 900 at step 1316. An example summary test result report 900 is discussed in further detail above for FIG. 9. A comparison tool may be called to compare summary test results with an established baseline for the test suite at step 1318. This step allows the user to determine whether the tested machines comply within an established standard. Furthermore, comparison provides a powerful tool for evaluating selected changes to a system be they experimental or diagnostic in nature. A comparison report is generated at step 1320 whereupon the method continues at step 320.

Step 1304—Obtain Additional Configuration Information

Figure 14A:
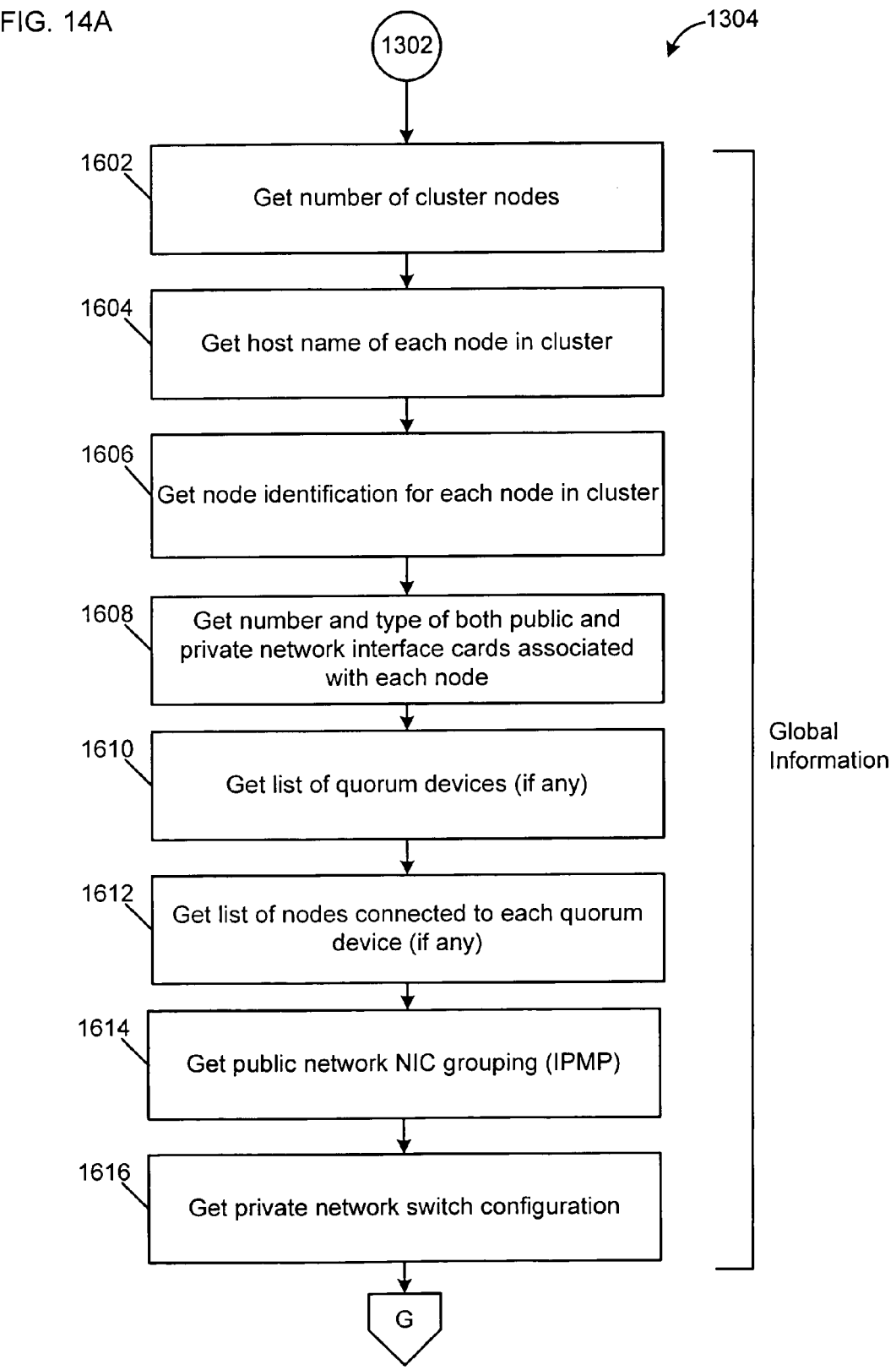
Figure 14C:
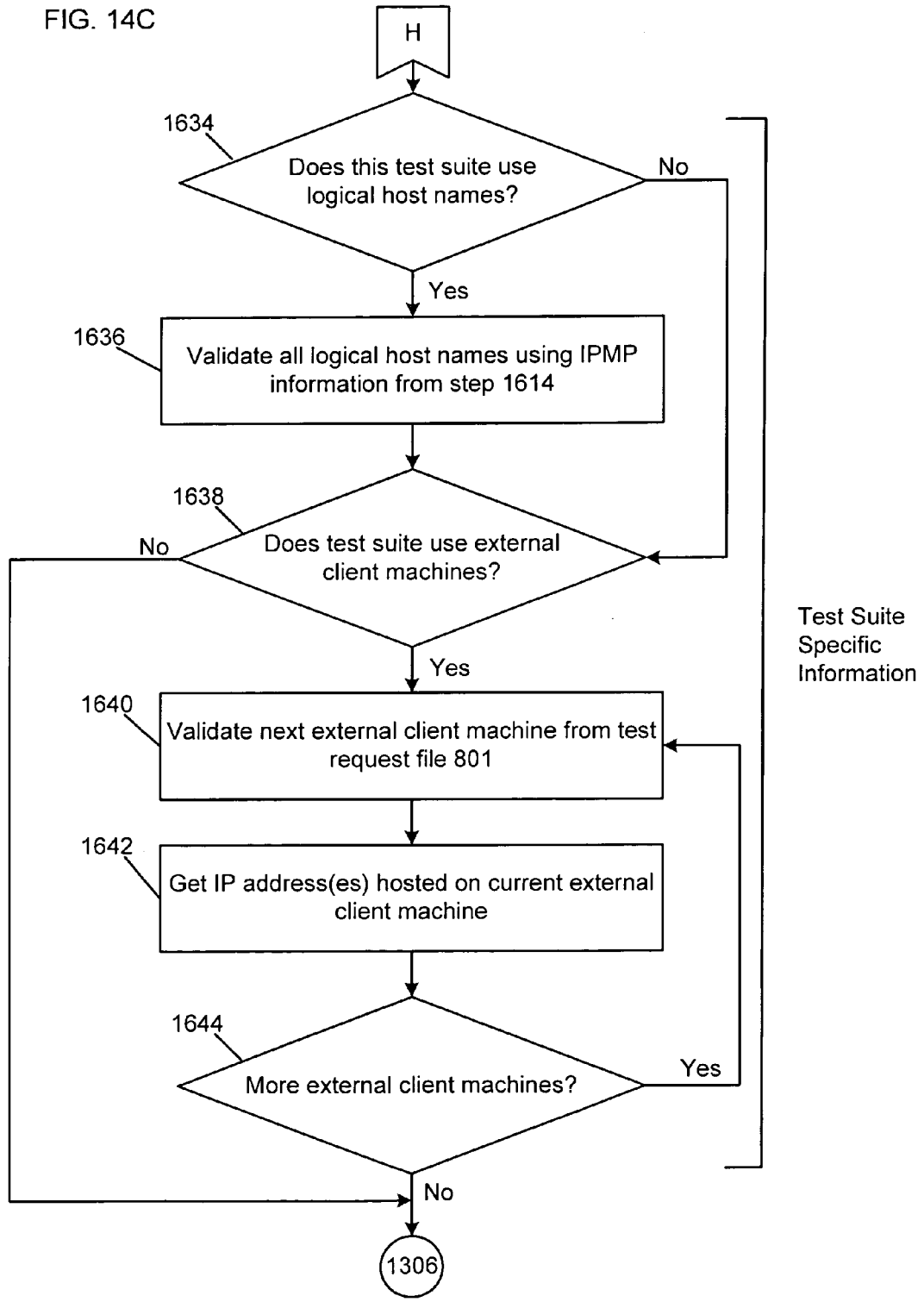

As noted above, the test driver module may obtain many different types of configuration information. For high availability systems, this configuration information may be classified into three general categories: Global Information, High Availability Specific Information, and Test Suite Specific Information. Global Information generally comprises information about devices that are available to the whole cluster. For example, a global device is a device that is accessible from all cluster members (nodes 100) such as a disk, CD-ROM, or tape device. Referring to FIGS. 14A–14C, FIGS. 14A–14C are process flow diagrams illustrating a method of querying a high availability computing cluster to obtain additional configuration information in accordance with an embodiment of the present invention. With reference to FIG. 14A, some example global information obtained as contemplated in the present invention comprises: the number of nodes (step 1602); the host name of each node in a cluster (step 1604); the node identification for each node in the cluster (step 1606); the number and type of both public and private network interface cards associated with each node (step 1608); the list of quorum devices associated with the cluster if any (step 1610); the list of nodes connected with each quorum device if any (step 1612); the public network NIC grouping (IPMP) (step 1614); and the private network switch configuration (step 1616). Notably, IPMP can be described as software that uses fault monitoring and failover to prevent loss of node availability because of a single network adapter of cable failure in an IPMP group. The IPMP group is a set of one or more network adapters on the same node on the same subnet configured to back up on another in the event of an adapter failure. It can be appreciated that all of this information may be manually retrieved by the user as well as automatically by the present invention. Further, as noted above, the additional information obtained by the test suite driver module provides a more complete profile of the system being tested so that test integrity may be preserved.

A second type of configuration information obtained is high availability specific information. With reference to FIG. 14B, examples of high availability specific information are: the primary node designation (step 1618); and the secondary node(s) designation(s) (step 1620). Because one of the goals of high availability systems is to provide near continuous access to data and applications, it may be desirable to test for failover. Failover is the process by which the cluster automatically relocates a service from a failed primary node to a designated secondary node. Thus, when testing for failover, primary and secondary node designations are necessary to determine an appropriate allocation of resources. The designation of primary and secondary nodes is somewhat arbitrary in that any node may serve either as a primary or a secondary node. However, only one primary node exists in any given instance while there may be one or more simultaneous secondary nodes, any one of which may be used to replace a failed primary node.

A third type of configuration information obtained is test suite specific information. With reference to FIGS. 14B and 14C, examples of test suite specific information may comprise three types: storage device information (step 1624 et seq.); logical host name information (step 1634 et seq.); and external client machine information (step 1638 et seq.). For a first type of example information—storage device information—the test system is queried first to determine whether any storage devices are being used at step 1624. If there are no storage devices used by the test suite, the process continues to obtain the next level of information. If there are storage devices being used by the test suite, the method proceeds to get the number of nodes connected to the device (step 1626); to get the primary node connected to the current device (step 1628); and to get the secondary node or nodes connected to the current device (step 1630). The method continues to query for storage device information until all the storage devices are accounted for at which point the method escapes the iterative loop at step 1632. For a second type of example information—logical host name information—the test system is queried first to determine whether the test suite uses logical host names at step 1634. If the test suite does not use logical host names, the process continues to obtain the next level of information at step 1638. If the test suite uses logical host names, then the logical host names are validated using Internet Protocol Network Multipathing (IPMP) information from step 1614 at step 1636.

For a third type of example information—external client machine information—the test system is queried to determine whether the test suite uses external client machines at step 1638. If there are no external client machines being used by the test suite, the method continues to step 1306, which is described below. If the test suite uses external client machines, the external client machine is validated from information contained in the test request file 801 at step 1640. Once the external client machine is validated, the IP address(es) hosted on the external client machines are obtained at step 1642. The method continues obtaining external client machine information until all the external client machines in the test system have been queried at which time the method proceeds to step 1306, which is described in further detail below. Notably, other types of configuration information may be gathered in manner similar to that described above as the framework described herein allows expansion to include any other new entity of interest.

Step 1306—Generate a Master Configuration File

Figure 13:
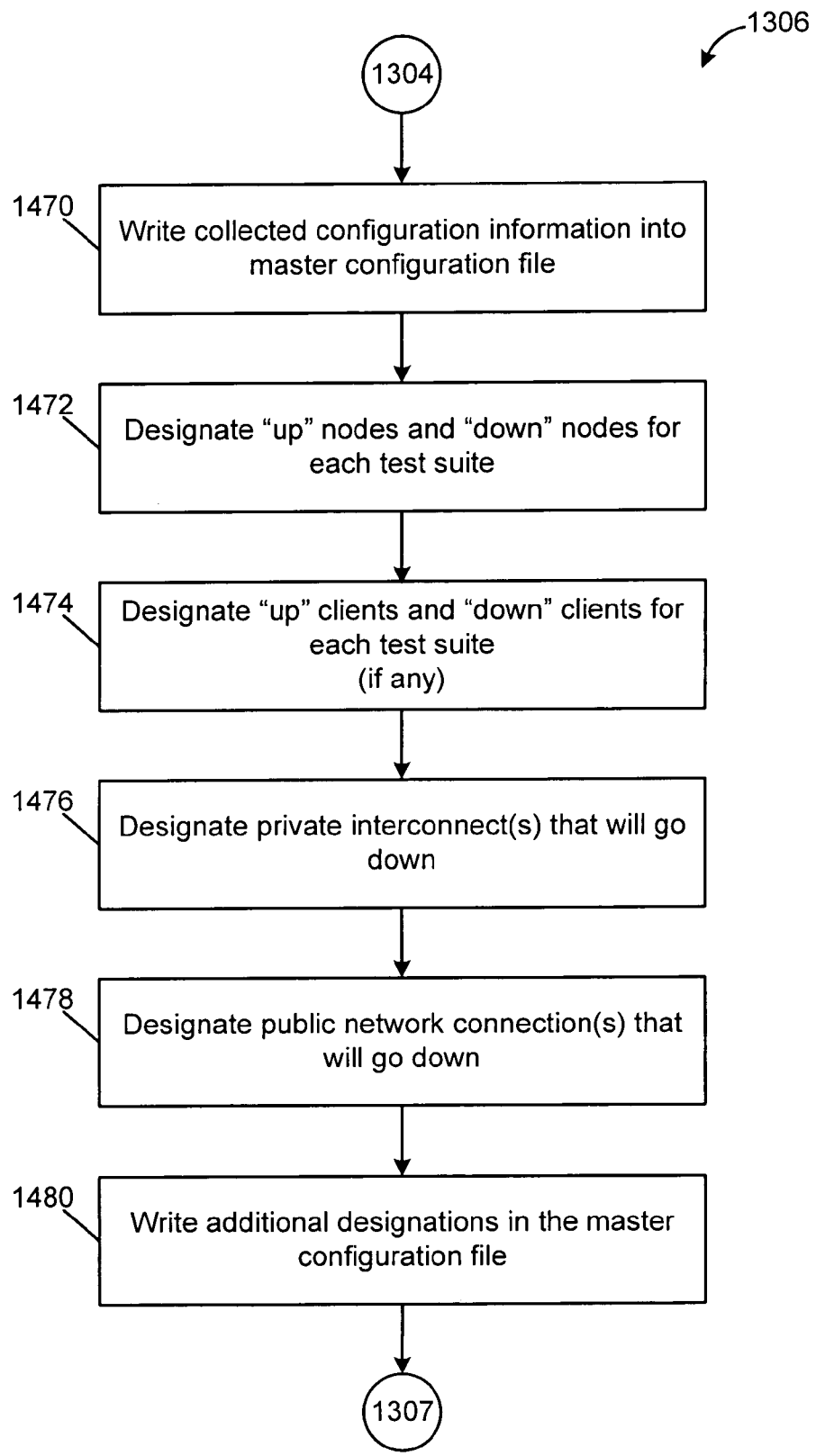
FIG. 13 is a process flow diagram illustrating a suitable method of generating a master configuration file in a high availability computing cluster (step 1306 of FIG. 10A) in accordance with an embodiment of the present invention.

In step 1306 as described above, a master configuration file 136 is generated with all the obtained configuration information including the user-defined information and the queried information. For high availability system testing additional designations are desirable to test for failovers. Referring to FIG. 13, FIG. 13 is a process flow diagram illustrating a suitable method of generating a master configuration file in a high availability computing cluster (step 1306 of FIG. 10A) in accordance with an embodiment of the present invention. At a first step 1470, the configuration information collected in steps 1301 and 1304 are written into the master configuration file. The additional designations begin at a step 1472 where "up" nodes and "down" nodes are designated for each test suite. Notably, although some nodes may be further designated as primary and secondary nodes, these designations are independent of "up" node or "down" node designations. In this example, a node or client designated as "up" is treated as a fully functioning node or client, while a "down" designation is treated as a node or client that is expected to go "down" as part of the relevant test, of which the framework needs to be aware for verification purposes.

Following the node designation at step 1470: clients (if any) are designated "up" or "down" at step 1474; private interconnect(s) (connections between nodes) that will go "down" are designated at step 1476; and public network connection(s) that will go "down" are designated at step 1476. Finally, these additional designations are written to the master configuration file at step 1480 and the method continues to step 1307 (FIG. 10A).

Step 1310—Launch Tests on all Applicable Systems

Figure 15A:
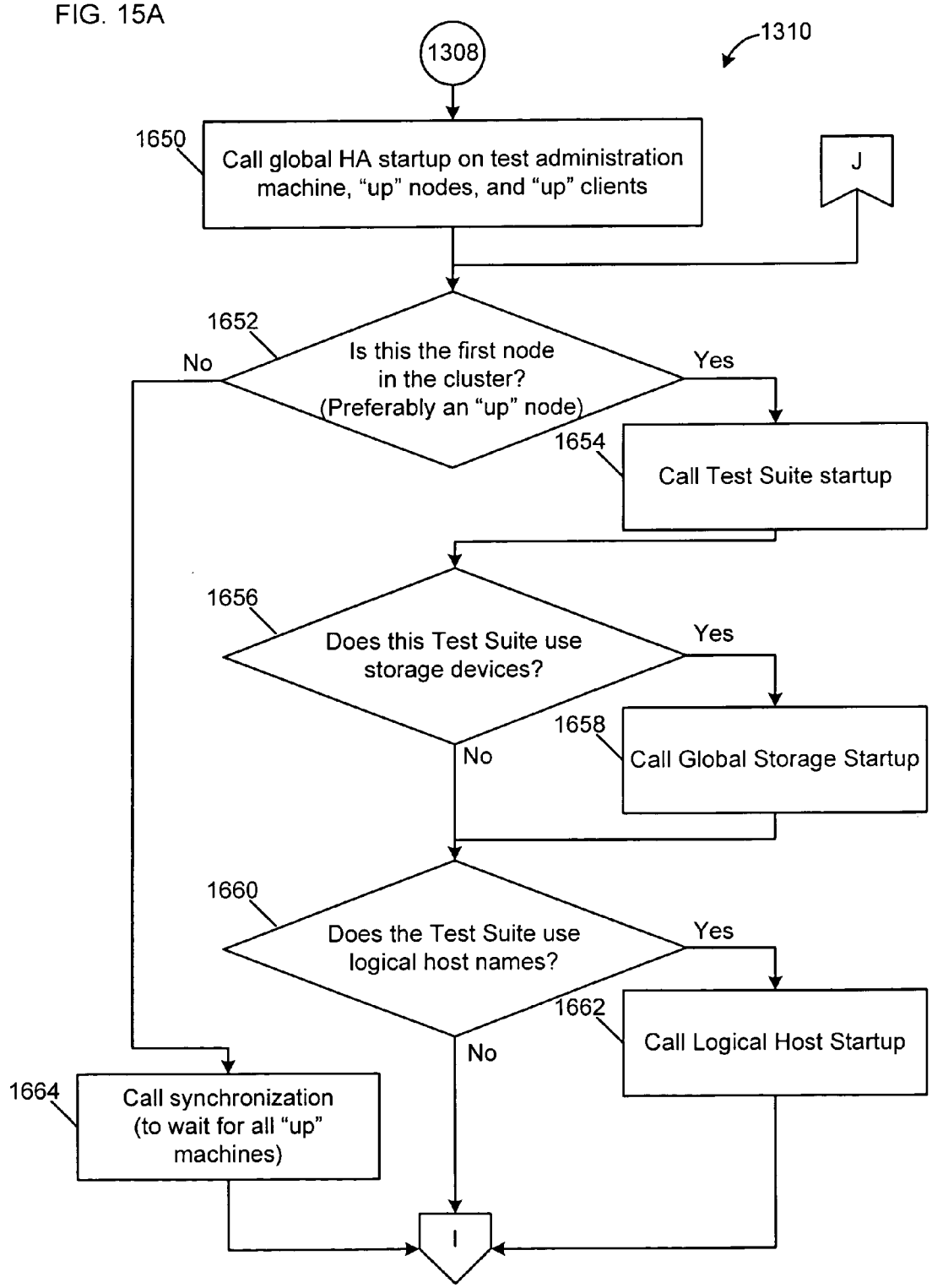
FIGS. 15A–15B are process flow diagrams illustrating a suitable method of launching tests in a high availability computing cluster having a plurality of computing nodes (step 1310 of FIG. 10A) in accordance with an embodiment of the present invention.
Figure 15B:
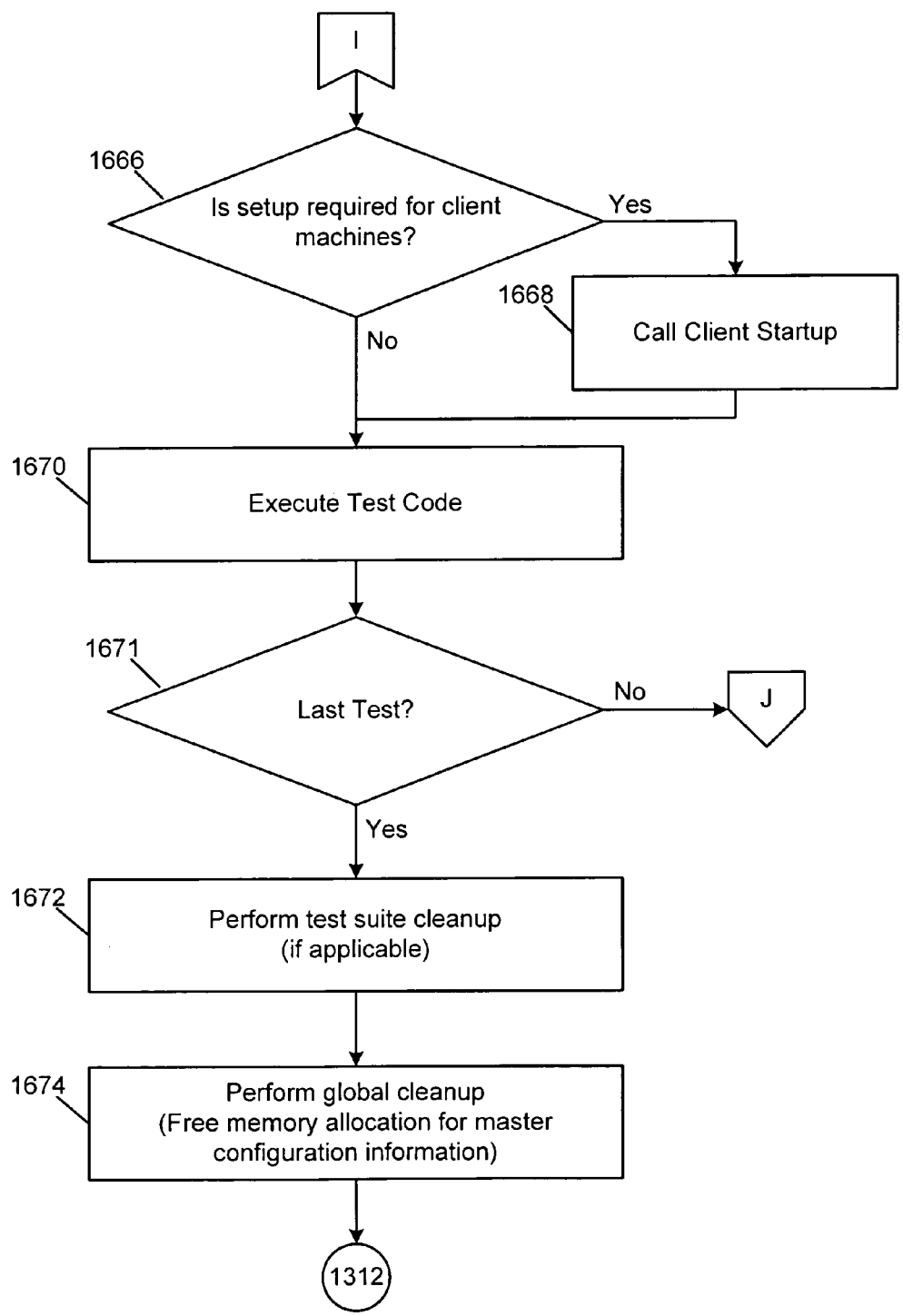

In step 1304 as described in detail above, various types of information are obtained through an automated query process. That information is particularly useful when launching the test on all applicable systems in step 1310. Turning to FIGS. 15A–15B, FIGS. 15A–15B are process flow diagrams illustrating a method of launching tests in a computing cluster having a plurality of computing nodes in accordance with an embodiment of the present invention. At a first step 1650, global HA startup is called on the test administration machine 105. Generally, global startup reads configuration file information and loads the information into memory variables that are later freed during a cleanup step described below (e.g., steps 1672 and 1674). Global startup is preferably initiated on "up" nodes and "up" clients. A node or client may be logically designated to be "up" or "down" depending on the requirements of the test suite module. As noted above, a node or client designated as "up" is treated as a fully functioning node or client, while a "down" designation is treated as a node or client that is expected to go "down" as part of the relevant test, of which the framework needs to be aware for verification purposes.

Once all the devices of interest are online, the method determines whether the first "up" node is being accessed at step 1652. In a preferred embodiment, any node is a designated "up" node. For example, if nodes 1 and 2 of a four to eight node cluster are designated "down" and nodes 3 and 4 of the same cluster are designated "up" nodes, then either node 3 or node 4 may be act as the first or second node. Thus, in one embodiment, if the first node is being accessed, the test suite startup is called at step 1654 and determinations of whether the test suite uses storage devices and logical host names at steps 1656 and 1660 respectively are made. If storage devices and logical host names are being used, then the global storage startup and logical host name startup processes are called in steps 1658 and 1662 respectively to utilize the relevant information. If, at step 1652, it is determined that the machine being queried is not the first node in the cluster, then the method calls a synchronization process that establishes a wait state until all "up" machines are available for testing at a step 1664.

Once all the machines are available for testing the method determines whether setup is required for client machines at a step 1666. If client machine setup is necessary, the client startup is called at step 1668 and the method continues at step 1670. The method then executes the test code at step 1670. If another test is required at step 1671, the method returns to step 1652 and repeats until the last test has been executed. At that time, test suite cleanup (step 1672) and global cleanup (step 1674) are performed where applicable. Cleanup allows the freeing up of memory allocated during the startup phase so that the tested machines may return to normal functions or may be subjected to further testing.

High Availability API's

As will be appreciated by those familiar with cluster based computing, a wide variety of test suites is needed in order to test the various operations that can be performed with a highly available data service. As was described above, in one implementation, two main classes of test suites can be defined: functional tests, and fault injection tests. A representative selection of test suites that are used in one implementation of the invention is presented below.

A first group of functional tests suites tests the ability to invoke a resource group with specific options, and query the invoked resource group to make sure that the resource group works as expected. Another feature of creating a resource group is that the resource group has to be able to be created from a single node, but be visible to all other nodes in the computing cluster. Deletion of resource groups is important in order to verify that the resource group does not create data on the computing cluster that cannot later be accessed and deleted.

A second group of functional test suites tests the ability to add and delete resources to resource groups, for essentially the same reasons that were discussed above for the resource groups.

A third group of functional test suites tests the ability to enable some resources while disabling other resources for specific applications.

A fourth group of functional test suites tests is similar to enable and disable resources tests above, but apply to entire resource groups rather than to individual resources.

A fifth group of functional tests suites tests the ability to enable and disable fault monitors for a resource, for example, during maintenance of the resource. If no such ability exists, the fault monitor would typically try to restart a resource that is not working properly, and after a few failed attempts redirect the processes on the resource to a different node in the computing cluster.

A sixth group of functional test suites tests the ability to put a resource under computing cluster control and take the resource out of computing cluster control. If a failure happens while a resource is unmanaged, the data service will not react, since the data service is not responsible for managing the resource anymore. Managing and unmanaging resources typically occurs during data service maintenance.

A seventh group of functional test suites tests the ability for users to add and delete resource types after their data service has been deployed, which is useful, for example, if the computing cluster is being upgraded with new nodes and devices.

An eight group of functional test suites tests the ability to forcibly switch over a data service running on one node in the computing cluster to another node in the computing cluster, for example, from a primary to a secondary node.

A first group of fault injection test suites tests the ability to kill a node using a reboot command and automatically transfer communications to a different node. This may be necessary, for example, during a system restart after system maintenance.

A second group of fault injection test suites tests what happens when a node is killed a node in a 'non-graceful' way, which for example would be the case during a power outage.

A third group of fault injection test suites tests the ability to automatically switch back to a primary node after a failure of that node and subsequent reinstalling of the node.

A fourth group of fault injection test suites tests the ability to kill individual application daemons running on different nodes of the computing cluster while still have a data service that works with very little or no disturbance, i.e. the high availability aspect of the data service application.

A fifth group of fault injection test suites tests the ability to automatically restart a fault-monitoring daemon if the fault-monitoring daemon were accidentally killed.

A sixth group of fault injection test suites simulates a fundamental problem on a node over a certain period of time, such as a repeated shut-down of the node, and examines how the high availability data service behaves.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of implementations of the invention have been described. Nevertheless, it will be understood that various modifications may be made without departing from the spirit and scope of the invention. Accordingly, other embodiments are within the scope of the following claims.

What is claimed is:

1. A method for testing a computing cluster having a plurality of computing nodes, the method comprising:
   receiving selected configuration information regarding a test system including the identification of at least one node of a computing cluster that is part of the test system;
   using systems operations to query selected components of the test system, including the computing cluster to obtain additional configuration information regarding the test system, including additional configuration information regarding the computing cluster;
   generating a configuration file based on the received and obtained configuration information;
   passing the configuration file to each computing machine in the test system; and
   launching a test suite on each computing machine in the test system required to perform the tests contemplated by the test suite.

2. A method as recited in claim 1 wherein the test system further includes at least one client computer, the method further comprising querying each client computer to obtain an IP address associated with the client computer.

3. A method as recited in claim 1 wherein the additional configuration information regarding the computing cluster includes a host name for each node in the cluster and a node ID for each node in the cluster.

4. A method as recited in claim 3 wherein each cluster node has a plurality of associated network interface cards and the additional configuration information further includes an identification of the type of each network interface card associated with each cluster node and a count of the number of network interface cards associated with each of the cluster nodes.

5. A method as recited in claim 3 wherein the additional configuration information further includes an identification of any quorum devices associated with the cluster and a count of the cluster nodes with which such quorum device is connected.

6. A method as recited in claim 3 wherein the additional configuration information further includes an identification of a private network switch configuration associated with the cluster.

7. A method as recited in claim 3 wherein the additional configuration information further includes an identification of a public network switch configuration associated with the cluster.

8. A method as recited in claim 1 wherein the test system further includes at least one storage device, the method further comprising querying to determine the number of cluster nodes with which each storage device is connected and to identity which cluster nodes serve as the primary and secondary nodes for each storage device.

9. A method as recited in claim 1 wherein the test system further includes at least one logical host name, the method further comprising validating the logical name.

10. A method as recited in claim 1 wherein the test system further includes at least one external client machine, the method further comprising validating the external client machine and obtaining an IP address for each external client machine.

11. A method as recited in claim 1 wherein the test system fiber includes a reporting tool for reporting the results of the test suite launched and a comparison tool for comparing the results of the test suite launched with a predetermined data set.

12. A test suite support module comprising:
   a plurality of global information-gathering tools configured to collect global information associated with a computer cluster testing environment;
   a plurality of test suite specific information-gathering tools configured to collect test suite specific information associated with the computer cluster testing environment;
   a plurality of generic tools, wherein the generic tools include a summary report generation tool, a plurality of start-up tools, a synchronization tool, and a plurality of cleanup tools.

13. The test suite support module of claim 12 wherein the global information further comprises;
   a count of cluster nodes in the computer cluster environment, a host name and a node identification for each of the cluster nodes in the computer cluster environment;
   an identification of the type of each network interface card associated with each cluster node and a count of the number of network interface cards associated with each of the cluster nodes an identification of any quorum devices associated with the cluster nodes and a count of the cluster nodes with which such quorum devices are connected;
   an identification of a private network switch configuration associated with the cluster; and
   an identification of a public network switch configuration associated with the cluster.

14. The test suite support module of claim 12 wherein the test suite specific information further comprises:
   a count of cluster nodes with which each storage device is connected and an identification of which cluster nodes serve as the primary and secondary nodes for each storage device;
   a determination of a logical host name, and
   a determination of an external client machine and an IP address corresponding with the external client machine.

15. The test suite support module of claim 14 wherein the storage devices, the logical host name, and the external client machine are validated.

16. The test suite support module of claim 14 wherein the plurality of start-up tools comprises: a global start-up tool, a test suite start-up tool, a global storage start-up tool, a logical host name start-up tool, and a client start-up tool.

17. The test suite support module of claim 14 wherein the plurality of cleanup tools include a test suite cleanup tool, and a global cleanup tool.

18. The test suite support module of claim 16 wherein the test suite start-up tool is configured to:
   a) create a file system of a predetermined size and type;
   b) mount the file system;
   c) create files and directories under the mounted file system;
   d) export the file system to a client machine;
   e) mount the exported file system on the client machine; and
   f) load a kernel.

19. The test suite support module of claim 14 wherein the plurality of start-up tools further comprises:
   a reporting tool for reporting the results of the test suite launched; and
   a comparison tool for comparing the results of the test suite launched with a predetermined data set.

20. A computer-implemented method for testing a computing cluster having a plurality of computing nodes, the method comprising:
   automatically receiving selected configuration information regarding a test system including the identification of at least one node of a computing cluster that is part of the test system;
   automatically using systems operations to query selected components of the test system, including the computing cluster to obtain additional configuration information regarding the test system, including additional configuration information regarding the computing cluster;
   automatically generating a configuration file based on the received and obtained configuration information;
   automatically passing the configuration file to each computing machine in the test system; and
   automatically launching a test suite on each computing machine in the test system required to perform the tests contemplated by the test suite.

21. A computer program product for testing a computing cluster having a plurality of computing nodes, stored on a machine-readable medium, comprising instructions operable to cause a computer to:
   receive selected configuration information regarding a test system including the identification of at least one node of a computing cluster that is part of the test system;
   use systems operations to query selected components of the test system, including the computing cluster to obtain additional configuration information regarding the test system, including additional configuration information regarding the computing cluster;
   generate a configuration file based on the received and obtained configuration information;
   pass the configuration file to each computing machine in the test system; and
   launch a test suite on each computing machine in the test system required to perform the tests contemplated by the test suite.

22. A method for a cluster node of a computing cluster having a plurality of cluster nodes being tested, the method comprising:
   receiving, by the cluster node, at least one query for configuration information from a test administration machine arranged to test the computer node;
   passing, by the cluster node, selected node configuration information to the test administration machine in response to the at least one query received;
   receiving, by the cluster node, a configuration file generated by the test administration machine; and
   launching, by the cluster node in response to a test administration machine command, a selected test suite using the configuration file generated by the test administration machine.

23. A method as recited in claim 22 wherein the receiving at least one query is generated from systems operations to query selected component of the cluster node to obtain additional configuration information regarding the cluster node.

24. A method as recited in claim 23 wherein the additional configuration information regarding the cluster node includes a host name for the node and a node ID for the node.

25. A method as recited in claim 24 wherein the additional configuration information regarding the cluster node further includes:
   an identification of the type of each network interface card associated with the cluster node;
   an identification of any quorum devices associated with the cluster node;
   an identification of any private network switch configurations associated with the cluster node; and
   an identification of any public network switch configurations associated with the cluster node.

26. A method as recited in claim 22 wherein the cluster node is attached with at least one storage device, the method further comprising receiving a plurality of queries from the test administration machine to determine the cluster nodes to which the storage device is attached and to identify which nodes serve as primary and secondary nodes for the storage device.

* * * * *

UNITED STATES PATENT AND TRADEMARK OFFICE
CERTIFICATE OF CORRECTION

| | | |
|---|---|---|
| PATENT NO. | : 7,165,189 B1 | Page 1 of 1 |
| APPLICATION NO. | : 10/741112 | |
| DATED | : January 16, 2007 | |
| INVENTOR(S) | : Sekhar Lakkapragada et al. | |

It is certified that error appears in the above-identified patent and that said Letters Patent is hereby corrected as shown below:

Title Page Col. 2 (U.S. Patent Documents); Line 6; After "7,016,946" delete "B1" and insert -- B2 --, therefor.

Column 24; Line 9; In Claim 8, delete "identity" and insert -- identify --, therefor.

Column 24; Line 20; In Claim 11, delete "fiber" and insert -- further --, therefor.

Column 24; Line 37; In Claim 13, after "comprises" delete ";" and insert -- : --, therefor.

Column 24; Line 58; In Claim 14, after "name" delete "," and insert -- ; --, therefor.

Signed and Sealed this

Seventeenth Day of April, 2007

JON W. DUDAS
*Director of the United States Patent and Trademark Office*